US010929836B2

(12) United States Patent
Barrett

(10) Patent No.: US 10,929,836 B2
(45) Date of Patent: *Feb. 23, 2021

(54) COMPUTING SYSTEM IMPLEMENTING A NETWORK TRANSACTION SERVICE

(71) Applicant: Expensify, Inc., San Francisco, CA (US)

(72) Inventor: David M. Barrett, San Francisco, CA (US)

(73) Assignee: Expensify, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,934

(22) Filed: Mar. 27, 2019

(65) Prior Publication Data
US 2019/0220849 A1 Jul. 18, 2019

Related U.S. Application Data

(63) Continuation of application No. 16/050,064, filed on Jul. 31, 2018, now Pat. No. 10,311,429, which is a continuation of application No. 14/730,139, filed on Jun. 3, 2015, now Pat. No. 10,068,225, which is a continuation-in-part of application No. 12/193,590, filed on Aug. 18, 2008, now Pat. No. 9,830,582.

(Continued)

(51) Int. Cl.
G06Q 20/34 (2012.01)
G06Q 20/02 (2012.01)
G06Q 20/20 (2012.01)

(52) U.S. Cl.
CPC ......... *G06Q 20/342* (2013.01); *G06Q 20/02* (2013.01); *G06Q 20/20* (2013.01); *G06Q 20/347* (2013.01)

(58) Field of Classification Search
None
See application file for complete search history.

(56) References Cited

U.S. PATENT DOCUMENTS 5,578,808 A 11/1996 Taylor
6,018,735 A 1/2000 Hunter
(Continued)

FOREIGN PATENT DOCUMENTS

WO WO-2010/131988 11/2010

OTHER PUBLICATIONS

Susan Hillman, "Notional vs. Pysical Cash Pooling Revisited," International Treasurer, pp. 1-4 (Feb. 2011).
(Continued)

*Primary Examiner* — Fateh M Obaid
(74) *Attorney, Agent, or Firm* — Mahamedi IP Law LLP

(57) ABSTRACT

A computer system can implement a network transaction service by receiving a transaction request from a computing device of a requesting user that has a customer account linked to the network transaction service. Based on the transaction request, the computer system can determine a merchant account of the registered merchant that is linked to the network transaction service. The computer system can then execute a remote transaction operation to transfer funds from a shared account of the network transaction service to the merchant account to fulfill the transaction request, where the shared account is different from the customer account of the requesting user.

20 Claims, 8 Drawing Sheets

Related U.S. Application Data

(60) Provisional application No. 60/956,691, filed on Aug. 18, 2007.

(56) References Cited

U.S. PATENT DOCUMENTS

| | | | |
|---|---|---|---|
| 6,065,675 A | 5/2000 | Teicher | |
| 6,473,500 B1 | 10/2002 | Risafi et al. | |
| 6,615,190 B1 | 9/2003 | Slater | |
| 7,104,443 B1 | 9/2006 | Paul et al. | |
| 7,127,426 B1 | 10/2006 | Coyle | |
| 7,249,092 B2 | 7/2007 | Dunn et al. | |
| 7,252,223 B2 | 8/2007 | Schofield | |
| 7,280,644 B2 | 10/2007 | Tamari et al. | |
| 7,401,731 B1 | 7/2008 | Pletz et al. | |
| 7,475,808 B1* | 1/2009 | Bishop | G06Q 20/02 235/379 |
| 7,567,934 B2 | 7/2009 | Flitcroft et al. | |
| 7,571,142 B1 | 8/2009 | Flitcroft et al. | |
| 7,865,432 B2 | 1/2011 | Doran et al. | |
| 7,873,573 B2 | 1/2011 | Realini | |
| 8,595,116 B1 | 11/2013 | Bettinger, II | |
| 9,613,487 B2 | 4/2017 | Kelly | |
| 9,691,056 B2 | 6/2017 | Bouey | |
| 9,830,582 B1 | 11/2017 | Barrett | |
| 2003/0144910 A1 | 7/2003 | Flaherty | |
| 2003/0222136 A1 | 12/2003 | Bolle et al. | |
| 2004/0007618 A1 | 1/2004 | Oram | |
| 2004/0122685 A1 | 6/2004 | Bunce | |
| 2005/0043999 A1 | 2/2005 | Ji et al. | |
| 2005/0091153 A1 | 4/2005 | Monk | |
| 2005/0182711 A1 | 8/2005 | Pulkkinen et al. | |
| 2006/0023248 A1 | 2/2006 | Reese et al. | |
| 2006/0069642 A1 | 3/2006 | Doran | |
| 2006/0104426 A1 | 5/2006 | Cataldi | |
| 2006/0155641 A1 | 7/2006 | Postrel | |
| 2006/0190347 A1 | 8/2006 | Cuervo | |
| 2006/0218024 A1 | 9/2006 | Lulla | |
| 2006/0230004 A1 | 10/2006 | Handley | |
| 2007/0078761 A1 | 4/2007 | Kagan | |
| 2007/0119920 A1 | 5/2007 | Hogg et al. | |
| 2007/0119923 A1* | 5/2007 | Garrison | G06Q 20/341 235/380 |
| 2007/0150414 A1* | 6/2007 | Templeton | G06Q 20/102 705/40 |
| 2007/0187492 A1 | 8/2007 | Graves | |
| 2007/0233615 A1 | 10/2007 | Tumminaro | |
| 2007/0244811 A1 | 10/2007 | Tumminaro | |
| 2007/0250441 A1* | 10/2007 | Paulsen | G06Q 40/02 705/39 |
| 2007/0255650 A1 | 11/2007 | Destrempes et al. | |
| 2007/0255662 A1 | 11/2007 | Tumminaro | |
| 2008/0017703 A1 | 1/2008 | Lu et al. | |
| 2008/0040261 A1 | 2/2008 | Nix et al. | |
| 2008/0040274 A1 | 2/2008 | Uzo | |
| 2008/0103972 A1 | 5/2008 | Lanc | |
| 2008/0177649 A1 | 7/2008 | Heywood | |
| 2009/0228380 A1 | 9/2009 | Evanitsky | |
| 2009/0249194 A1 | 10/2009 | Day | |
| 2009/0271265 A1 | 10/2009 | Lay et al. | |
| 2010/0094668 A1 | 4/2010 | Gupta | |
| 2010/0185536 A1* | 7/2010 | Rentala | G06Q 30/0282 705/30 |
| 2011/0010277 A1 | 1/2011 | Enzaldo | |
| 2011/0131135 A1 | 6/2011 | Carlson | |
| 2011/0251907 A1 | 10/2011 | Tavares | |
| 2011/0270618 A1 | 11/2011 | Banerjee | |
| 2011/0313926 A1* | 12/2011 | Templeton | G06Q 20/10 705/44 |
| 2012/0066120 A1 | 3/2012 | Ringewald | |
| 2012/0136790 A1* | 5/2012 | Templeton | G06Q 20/10 705/44 |
| 2012/0203572 A1 | 8/2012 | Christensen | |
| 2012/0221422 A1 | 8/2012 | Sobek | |
| 2012/0265625 A1 | 10/2012 | Pletz et al. | |
| 2013/0198081 A1 | 8/2013 | Royyuru et al. | |
| 2013/0297511 A1 | 11/2013 | Monk | |
| 2013/0304559 A1 | 11/2013 | Stone | |
| 2014/0040131 A1 | 2/2014 | Andrews | |
| 2014/0250016 A1 | 9/2014 | Kranzley | |
| 2017/0193410 A1 | 7/2017 | Jones-Mc-Fadden | |
| 2017/0220976 A1 | 8/2017 | Schmidt | |

OTHER PUBLICATIONS

Adam J. Levitin; Payment Wars: The Merchant-Bank Struggle Control of Payment Systems; 12 Stan. J. L. Bus. & Fin. 425 (2006-2007), pp. 425-485 (Spring 2007).

John Bulmer; Payment Systems: The Debt Market in Canada; Parliamentary Information and Research Service, International Affairs, Trade and Finance Division (Sep. 24, 2009).

Julia S. Cheney; Prepaid Card Models: A Study in Diversity; Federal Reserve Bank of Philadelphia Payment Cards Center Discussion Paper No. 05-03 (Nov. 11, 2006).

\* cited by examiner

COMPUTING SYSTEM IMPLEMENTING A NETWORK TRANSACTION SERVICE

CROSS-REFERENCE TO RELATED APPLICATIONS

This application is a continuation of U.S. patent application Ser. No. 16/050,064, filed on Jul. 31, 2018; which is a continuation of U.S. patent application Ser. No. 14/730,139 (now U.S. Pat. No. 10,068,225), filed on Jun. 3, 2015; which is a continuation-in-part of U.S. patent application Ser. No. 14/193,590 (now U.S. Pat. No. 9,830,582), filed on Aug. 18, 2008; which claims the benefit of priority to U.S. Provisional Patent Application No. 60/956,691, filed on Aug. 18, 2007; all the aforementioned applications being hereby incorporated by reference in their respective entireties.

BACKGROUND

Individuals and businesses are increasingly turning to prepaid cards as a reliable means to enable cardholders to make electronic and in-person purchases without the inconvenience of cash or the risk of credit. Prepaid cards broadly fall into two categories: "closed loop" cards that are tied to a particular merchant (Sears™, Starbucks™, etc.) for loyalty or incentive purposes, and "open loop" cards that are branded with the logo of a major network (Visa™, Master-Card™, Discover™, etc.) and usable at any merchant that accepts that logo.

The most notable form of prepaid card—for both open and closed-loop cards—is the "gift card". A gift card is a consumer product where one individual "loads" funds onto the card and then gives the card to someone as a gift. The recipient then uses this card in lieu of cash to either purchase from a given merchant (in the case of a closed-loop card), or anywhere the card's logo is accepted (open-loop card).

Another form of prepaid card is the "expense card"—typically an open-loop card—where an employer loads funds onto the prepaid card and distributes to employees to make business purchases.

Additional forms exist for remittance purposes (a family member in one country loads funds onto the card to be spent by the family in another country), payroll services (the paycheck of an employee is loaded onto the prepaid card instead of going to a bank account), and so on.

Unlike a "credit card", where each purchase draws from a line of credit associated with the card, every purchase authorized by a prepaid card is supported by funds that have been secured by the card's issuer before the purchase is authorized. As such, the risk of non-payment experienced by issuers of credit cards is almost completely avoided by issuers of prepaid cards.

But this safety advantage to prepaid card issuers creates a corresponding disadvantage for prepaid card customers. Specifically, the customer purchasing the prepaid card must "load" funds onto the card before it can be used. Unlike a credit card which can be used to purchase up to a certain limit with the understanding that it will be later repaid, the prepaid card can only be used when funds are loaded onto the card in advance.

This disadvantage is further compounded by the simple fact that the customer of the prepaid card generally does not know at the time funds are loaded on the card, exactly what will be purchased. Accordingly, the customer must typically load onto the card the maximum amount that could conceivably be used, even if that means putting more funds onto the card than will actually be used.

Similarly, a disadvantage of the prepaid model is funds are typically loaded onto the card days, weeks, or months prior to any purchase actually occurring. During this period, those same funds cannot be used for any other purchase, cannot be used for investment purposes, cannot be used to pay off debt, etc.

The largest disadvantage of the prepaid model is after a purchase is actually made, there are generally funds left on the card. These funds are often insufficient for any significant purchase, and thus are ignored and never actually spent. Unspent funds on prepaid cards are classified as "abandoned" after some period of inactivity (or expiration of the card), and often default to the card issuer or the state—but rarely to the customer who purchased the card or the person who holds it.

BRIEF DESCRIPTION OF DRAWINGS

FIG. 6A through FIG. 6E illustrate alternative graphic user interfaces for use by users of a payment processing system, such as provided with an example of FIG. 1.

DETAILED DESCRIPTION

Figure 1:
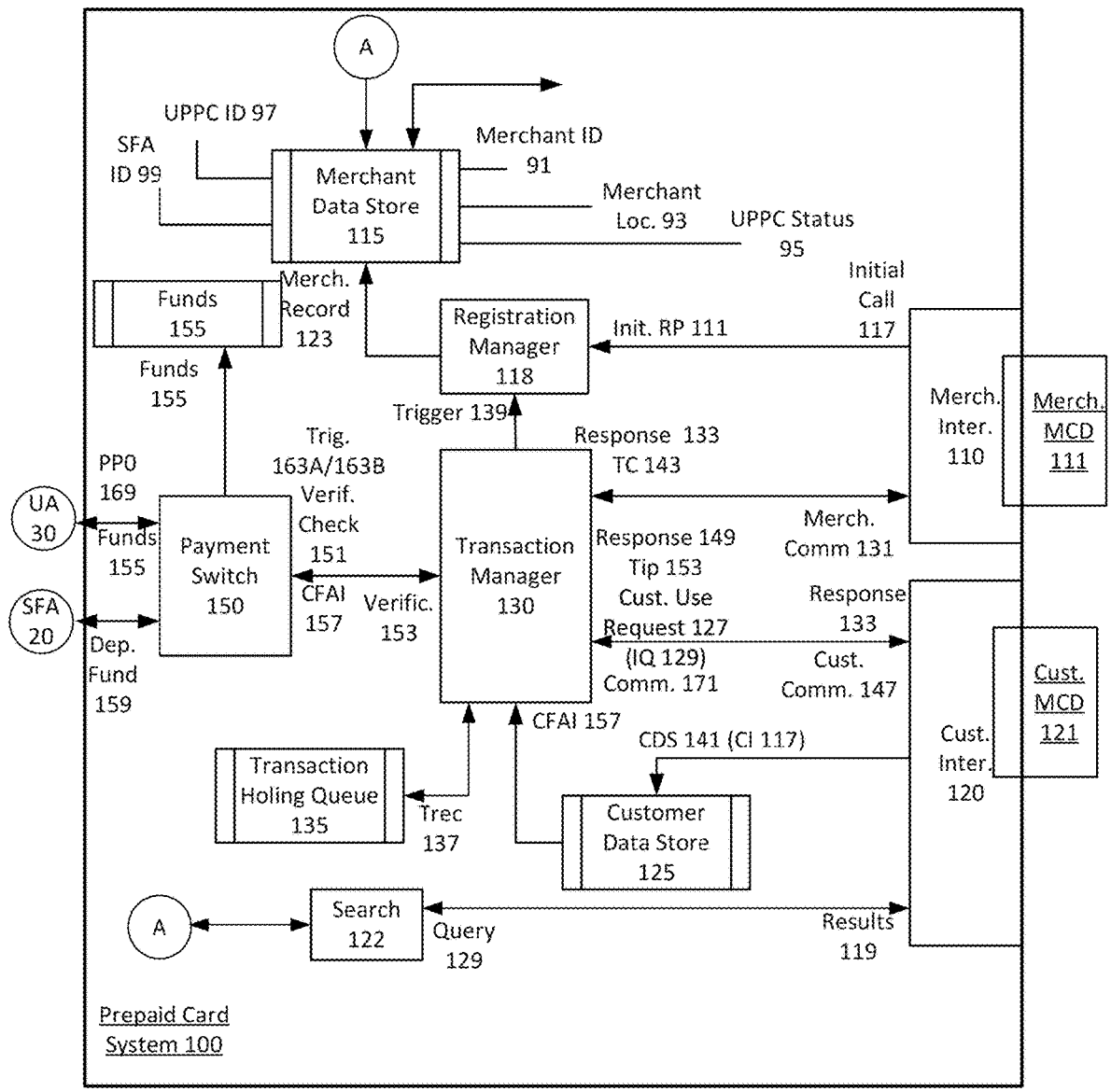
FIG. 1 illustrates a payment processing system for implementing universal prepaid cards which reside at merchant locations for use by authorized users, according to one or more embodiments.

Examples described herein include a payment processing system or service for enabling merchants to control a payment mechanism which can be independently shared by multiple customers. According to some embodiments, a payment processing system links a merchant or merchant location to a payment instrument that is under the control of the merchant and available to at least a class of merchant customers.

In some embodiments, an example of a payment instrument is provided by a single-account card instrument, which can be of a prepaid debit card type. A prepaid card instrument which is controlled by the merchant and made available to one or more multiple merchant customers is termed herein as a "universal prepaid card" (or alternatively as "UPPC").

As described with numerous examples, a merchant can maintain a universal prepaid card (or universal prepaid card account) at a merchant location, and a payment processing system such as described can provide funds for the universal prepaid card in advance, or on an as-needed basis. Among other benefits, this enables the universal prepaid card to be used by multiple customers, with added security measures which are not present with conventional financial card instruments.

According to an embodiment, a card instrument is initialized to be active at a given merchant location. The card instrument being linked to receive funds from a shared fund account. A network service may authorize the card instrument for use with multiple transactions which occur over a given duration, each transaction being for any one of a group of customers who have each registered a customer funding account with the network service. The shared fund account of the card instrument can be separately maintained in order to individually fund each of the multiple transactions that occur in a given duration.

According to one aspect, a universal prepaid card is made available for use at the merchant location. The universal prepaid card may be provided to physically reside at the merchant location. The universal prepaid card can be linked to the merchant location and made available for use by merchant customers who are also users of a service for the universal prepaid card. A universal prepaid card can be linked to a shared funding source that enables the authorized merchant customers to use the prepaid card for their respective transaction. In this regard, the universal prepaid card is without association to a specific customer, but rather made available for a class of customers (e.g., those who are users of a service accompanying the universal prepaid card).

In some examples, a network service can be implemented by a combination of servers or computers which communicate with mobile computing devices of customers, as well as with designated merchant resources (e.g., merchant owned mobile computing device or merchant computer station, point-of-sale device, telephone, etc.). In some implementations, the service can be distributed, using programmatic components or logic on customer and/or merchant devices.

According to some examples, a system and method are provided for implementing a network based service. In an example, the network service operates to initialize and link a card instrument to a merchant or merchant location, so that the merchant can receive funds the service. Over a given duration, one or more requests are detected to use the card instrument for one or more transactions, where each transaction involves a corresponding customer who has registered a customer funding account with the network service. For each of the transactions, a merchant account is funded using the card instrument. In funding the merchant account for each transaction, (i) a funding account for the card instrument is identified for at least that transaction, (ii) sufficient funds for the transaction are provided in the funding account of the card instrument, and (iii) the network service detects when card instrument is processed by the merchant or at the merchant location to transfer funds from the funding account to a corresponding merchant account. Additionally, for each of the one or more transactions, funds are obtained from the registered customer account of the corresponding customer involved in that transaction.

According to one aspect, the service can detect a customer action that indicates the customer's intent or desire to use a universal prepaid card at a particular merchant location. The service may provide a shared funding source that is associated or linked with the universal prepaid card, and the merchant may process the universal prepaid card (e.g., as a conventional credit card) to obtain funds for the transaction. Subsequently, the service can communicate with the customer to obtain approval of the transaction, as well as authorization for surcharge or tip. The service can then obtain funds for the transaction from a customer account, and further enable the merchant to process the universal prepaid card for the surcharge amount.

Still further, in some embodiments, a plurality of universal prepaid cards are distributed over a geographic region, with individual prepaid cards being provided to corresponding merchant locations of the geographic region. A system includes memory resources and one or more processors to store and maintain one or more data structures for providing a service for use with universal prepaid cards. In one example, the system may store and maintain a first data structure for each of the plurality of prepaid cards, including (i) an identifier of each of the plurality of prepaid card, and (ii) a merchant identifier for each merchant location in the geographic region where the prepaid card physically resides. For a collection of the plurality of prepaid cards, the stored information can also include (iii) one or more communication identifiers that are associated with each of the prepaid cards of the collection. In some variations, a second data structure is provided to (i) list an identifier for each customer in a population of customers, (ii) associate a customer communication identifier with the identifier of each customer, and (iii) associate a funding account of that customer with the customer identifier. One or more processors execute instructions stored in the memory resources to process, in connection with a transaction at a merchant location, a customer data set which identifies a given customer identifier from the second data structure. The one or more processors further process a transaction data set which is communicated from a given merchant of the merchant location using one of the communication identifiers associated with the identifier of the prepaid card. The transaction data may include an amount of the transaction. The one or more processors may also confirm, by accessing a funding source of the prepaid card, that the given merchant has processed the amount identified by the transaction data set for authorization or payment from the funding source. Furthermore, the one or more processors may use the customer communication identifier to provide a communication to the customer identified by the customer data set. The communication may identify the processed amount as previously communicated by the merchant. In response to the customer providing the confirmation action, the funding account of the customer may be accessed by the one or more processors for funds that include or correspond to the amount.

According to an aspect, an embodiment includes an electronic payment processing system which enables a merchant to offer a payment mechanism that is linked to the merchant and not the customer, but which the merchant can offer to customers for purpose of completing transactions with the merchant. In some embodiments, the payment mechanism which is offered to customers includes a universal prepaid card that is funded by the electronic processing system. Accordingly, an electronic payment processing system enables merchants to access and offer customer's use of an independently funded universal prepaid card. Among other benefits, examples such as described enable the merchant to have control over the payment mechanism.

Moreover, according to another aspect, embodiments describe an alternative to the payment/collection process which exists under conventional practices. For many kinds of merchants, the elimination of a disruptive or tedious payment process provides an opportunity to enrich the customer experience and develop a relationship with the customer. For the customer, an electronic payment processing system such as described provides convenience and security, as the customer's payment and account information is not shared with the merchant. For these and other reasons, examples described provide an electronic payment processing system which is more efficient for both customers and merchants, in terms of convenience, security and enhancing customer experience.

According to another aspect, an electronic payment processing system is provided which links a payment mechanism, provided in the form of a prepaid debit card, with a funding source that can be made available for multiple customers, transactions and/or merchants. The shared funding source can include, for example, an account established for the payment mechanism with a service provided by, for example, an electronic payment processing system, as described with various examples provided herein. An account or source may be "shared" in that funds from the account (or source) can be used independently for multiple transactions and/or customers, independent of one another. Thus, by way of example, the shared funding account can be dedicated for the particular payment mechanism, or the account can fund multiple different payment mechanisms with one or more multiple merchants. In some variations, the shared funding source can correspond to multiple accounts with funds for transactions. In some alternative variations, the shared funding source can correspond to a dynamically determined account, which can be selected and/or created for the corresponding payment mechanism on an individual basis (e.g., per day, per transaction etc.).

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Payment Processing System

FIG. 1 illustrates a payment processing system for implementing universal prepaid cards which reside at merchant locations for use by authorized users, according to one or more embodiments. A payment processing system 100 such as shown by an example of FIG. 1 can be implemented in a variety of computing environments, including as a network service to enable users to locate and utilize universal prepaid cards in order to provide payment for a transaction. In one implementation, the payment processing system 100 can be implemented using one or more servers which implement backend operations to enable the use of a universal prepaid card ("UPPC 10") at a given merchant location. According to some aspects, the payment processing system 100 can further be implemented in part by computing devices of the customer and/or merchant. For example, a mobile computing device of a customer may run an application for implementing functionality used with payment processing system 100. Likewise, a merchant location can be associated with a mobile computing device (or other computer platform) which runs an application for implementing merchant related functionality describe with payment processing system 100. Still further, while some examples are described which implement payment processing system 100 using one or more servers, variations may utilize other computing environments, such as provided by a proprietary network.

Among other benefits, payment processing system 100 offers convenience to authorized customers of a merchant location, in that the customer can provide payment for the transaction automatically, without need for the customer to perform any affirmative action. Moreover, the process in which the customer provides payment can be performed asynchronously and independent of the customer's interaction with the merchant location. For example, in the context of a restaurant, the customer can simply leave the merchant location once the meal is finished, and the process for obtaining payment from the customer can be completed at a later time.

In an example such as described with FIG. 1, the payment processing system 100 can offer a customer the convenience of leaving when he is done with his meal. At the same time, the payment processing system 100 can offer a merchant the service and convenience of the UPPC 10, without requiring the merchant to invest in new equipment or financial payment resources. Rather, the merchant can use existing financial processing infrastructure to process a customer's use of the UPPC 10. For example, the merchant can use a standard point-of-sale terminal, combined with a payment network such as provide by VISA, MASTERCARD, AMERICAN EXPRESS, DISCOVER or ACH.

As described with numerous examples, the UPPC 10 can be delivered unsolicited to a merchant, and then subsequently activated for the merchant or merchant location. In use, the UPPC 10 can be handled and processed as a prepaid debit card through a standard credit card authorization network, which nearly all merchants are equipped to provide.

As described in greater detail, payment processing system 100 operates to associate individual UPPC 10 with a corresponding merchant location. Additionally, payment processing system 100 can operate to manage a shared funding source for each UPPC 10. The payment processing system 100 can operate to provide immediate funds, or authorization for funds, when a given UPPC 10 is used at an associated merchant location. Operations to verify that the funds accessed by the merchant are authorized can be implemented asynchronously, such as after when the customer leaves the merchant location. In this way, the payment processing system 100 can link each UPPC 10 with a shared funding source, which can provide funds for transactions. According to an example of FIG. 1, the shared funding source corresponds to a shared funding account 20, and each UPPC 10 is linked to a corresponding shared funding account 20. In variations, multiple the shared funding source can correspond to multiple accounts, each of which are linked one or more UPPC 10. Still further, the shared funding source can include or correspond to logic which dynamically assigns and/or creates an account for funding one or more UPPC 10 on an event (e.g., every day or week, after each transaction) or on-demand basis (e.g., just prior to authorizing funds through the UPPC 10 of a given merchant).

In an implementation described with FIG. 1, the shared funding source is shown and described as shared funding account 20. The payment processing system 100 can be funded repeatedly over a given time period. The repeated funding of the corresponding shared funding account for the UPPC 10 enables multiple participating customers to use the UPPC 10 over a given time period. As will be described in greater detail, a customer who utilizes the UPPC 10 can complete a transaction payment process automatically based on parameters such as customer location (e.g., transaction can be completed when the customer leaves the merchant location). Thus, the customer can utilize the UPPC 10 at a merchant location without performing any affirmative or assertive actions within the merchant location. For example, a customer who utilizes the UPPC 10 at a restaurant can simply leave upon completing his or her meal, without discussion, notification or approval from the restaurant.

According to one implementation, the UPPC 10 resides at the merchant location and is utilized by the customer automatically based on (i) a setting or input of the customer, and (ii) physical presence of the customer at the merchant location. Thus, the customer can make a single use of a UPPC 10 that is pre-established a particular merchant location and available to multiple customers. The UPPC 10 is not linked to the customer, and once the customer is finished using the UPPC 10 for his or her transaction, the UPPC 10 is made available for another customer as needed. The customer can receive a single use of the UPPC 10, and the UPPC 10 is funded from a shared funding account which the customer reimburses asynchronously at a later time. From the perspective of the customer, the UPPC 10 offers a secure payment mechanism, as the customer does not need to use his own personal information or credit card at the merchant location. Likewise, the merchant also receives a secure payment mechanism in that the backend processes of payment processing system 100 ensure that the merchant receives immediate payment (or authorization for payment) from the shared funding account of the UPPC 10.

Additionally, payment processing system 100 can offer customers another convenience of maintaining discretion and confidentiality as to, for example, an amount of a transaction, since payment processing system 100 enables the UPPC 10 to be utilized with no affirmative action of the customer (e.g., the customer does not need to discuss the transaction with the merchant). Rather, the customer can simply leave the merchant location, and have the merchant complete the transaction which the customer reviews and approves at a later time. In the context of restaurants, for example, customers bring guests, and there is sometimes appreciation for discretion as to when and how payment for the group is made (e.g., such as when a customer wishes to treat another guest). In an example of FIG. 1, payment processing system 100 enables the customer to forego an uncomfortable process of receiving the check and then paying for the check. In an example of FIG. 1, the customer can simply skip the check process and leave with the guests.

With further reference to FIG. 1, payment processing system 100 includes merchant interface 110, customer interface 120, transaction manager 130, and payment switch 150. The merchant interface 110 can be utilized by merchants in order for guests to register and be associated with the UPPC 10 at that merchant location. Once the merchant establishes the UPPC 10, any number of authorized customers can utilize the UPPC 10 at a later time. The merchant interface 110 can subsequently be used to implement steps in the processing of the transaction when a customer elects to utilize the UPPC 10. Among other functions, the customer interface 120 enables the user to view merchants who have corresponding UPPC 10 available for use. For example, the customer can interact with the customer interface 120 in order to see merchants which offer the UPPC 10 in a designated geographic region or locality. As described in greater detail, the customer interface 120 can also be used to verify charges asynchronously after when the customer leaves the merchant premise.

The transaction manager 130 can be implemented to initiate and complete a transaction using the UPPC 10 at a given merchant location. For a given customer interaction, the transaction manager 130 can verify a transaction amount, communicate the transaction amount to the customer, and subsequently obtain funds from a customer funding account for reimbursement to the shared funding account. Among other functions, the transaction manager 130 can operate to initiate the process to obtain funds (or authorization of funds) from the customer funding accounts 30 for purpose of reimbursing the shared funding account 20.

The payment switch 150 includes logic to analyze, trigger funding of, and/or monitor access of the shared funding account 20. Among other functions, the payment switch 150 can link the shared funding account 20 with the UPPC 10 as part of an initial activation process. Once linked, the payment processing system 100 can fund the shared funding account 20 for access by merchant running the UPPC 10 through the merchant point-of-sale terminal. In some variations, the transaction manager 130 can manage the state of the customer and merchant engagement during a transaction, and further signal the payment switch 150 in order to cause the payment switch to monitor the shared funding account 20 for withdrawal requests from the merchant. In some variations, the payment switch 150 can obtain approval information 171 (e.g., actual amount of transaction, predicted transaction amount, transaction limit for customer or merchant, etc.) from the transaction manager 130 to approve the merchant's access to the shared funding account 20 when the merchant processes payment for the customer transaction.

In variations, the payment switch 150 can also link the UPPC 10 with a particular point-of-sale terminal at the merchant location. Still further, the payment switch 150 can link the UPPC 10 with a geographic location of the merchant location. The payment switch 150 can implement security rules or logic 154 to monitor and guard against use of the UPPC 10 unless the UPPC 10 is processed through the specific point-of-sale terminal and/or merchant location.

Setup Process

In an example of FIG. 1, users can include both merchants and customers, and users of each role can utilize the payment processing system 100 by completing a corresponding set-up process. As customers, users can enroll or register through customer interface 120. The customer interface 120 can include programming or logic that resides on a server of system 100. As an addition or alternative, the customer interface 120 can be implemented using a distributed computing platform that can be implemented in part using an application or application component that runs on a mobile computing device 121 of the user. A user can complete a customer registration process by providing a customer data set 141. In an example of FIG. 1, the customer data set 141 can be stored in a customer data store 125. The customer data set 141 may include user name and/or identifier (e.g., picture) of the customer, one or more communication identifiers (e.g., mobile computing device telephony number, messaging identifier), and one or more account records which can enable programmatic or remote access to a customer funding account 30 (e.g., such as provided for a credit card, debit card, or checking account). The information provided with the customer registration process can enable system 100 to subsequently obtain authorization and funds from a funding account 20 of the user in connection with use of UPPC 10 located at different merchant locations which the particular customer conducts transactions at.

For merchants, an enrollment process can include a preliminary step of putting the merchant in physical possession of a UPPC 10. According to one aspect, each merchant in a given geographic region can receive physical delivery (e.g., through postal mail) of a UPPC 10. For example, a merchant can be provided an unsolicited UPPC 10. In one example, the UPPC 10 can have no link or association with the merchant, rather the linkage between the UPPC 10 and the merchant is created when the merchant first registers the prepaid card.

In one example, the UPPC 10 is sent to addresses of merchants using a merchant database 115. The merchant database 115 can store merchant records 123, which can include records that identify merchants who have received a UPPC 10 but not yet activated the UPPC 10. Each UPPC 10 can correspond to a debit card instrument, having a numerical identifier (e.g., printed or marked on the card itself) that distinguishes the UPPC 10 from other cards. By way of example, the merchant data store 115 can store a list of merchant identifiers (e.g., business names) 91, and merchant locations 93 (e.g., street address, longitude or latitude).

Each UPPC 10 can be delivered to a corresponding merchant location with instructions or guidance to inform the merchant operator to store the UPPC 10 next to a point-of-sale terminal. In one implementation, the system 100 includes a distribution component which sends a batch set of UPPC 10 to merchant locations of a particular geographic region. The batch set of UPPC 10 can be sent unsolicited, but made registerable through system 100 at time of first use. In one implementation, the merchant instructions can also specify that the merchant contact a resource of system 100 in order to activate the 10.

In some cases, the merchant initiates contact with payment processing system 100 to register for use of the UPPC 10. In one implementation, the merchant initiates contact with payment processing system 100 upon receiving a UPPC 10. The contact information provided with the UPPC 10 can trigger implementation of a registration process. A registration manager 118 can, for example, implement a registration workflow which prompts the merchant to enter information and perform actions to link to the prepaid card. In one implementation, the merchant is instructed to run a small charge through the UPPC 10. The transaction manager 130 can signal a verification check 151 to the payment switch 150 in order to determine whether the merchant's point-of-sale terminal was able to access the shared funding account 20. For purpose of verification and setup, the initial charge processed using the UPPC 10 against the shared funding account 20 can be declined. The payment switch 150 can monitor the shared funding account 20 for information that identifies the attempted small charge, as well as information that identifies the entity, resource and attribute that utilized the UPPC 10 in order to create the small charge. For example, the switch 150 can monitor the charges made for the shared funding account 20 in order to identify data that identifies the point-of-sale terminal, including data which can identify one or more of (i) an identifier (e.g., machine) of a merchant's point-of-sale terminal, (ii) a geographic identifier associated with the merchant's point-of-sale terminal, (iii) a identifier communicated through the merchant's point-of-terminal. According to some examples, the payment switch 150 can extract such information from the authentication access for the shared account 20, and further store the data of the merchant in association with the specific UPPC 10. The status 95 of the merchant as registered or activated (in connection with the corresponding UPPC 10) can be updated in the merchant data store 115. Additionally, the identifier 97 of the UPPC 10 for that merchant can be associated with the merchant record. Additionally, the shared funding account identifier ("SFA ID 99") for the UPPC 10 that is associated with the merchant can also be included in the same record.

In some examples, the registration manager 118 may also request the merchant to supply a communication identifier (e.g., mobile telephone phone number, application identifier) in order to register the UPPC 10. When the UPPC 10 is registered, the registration manager 118 can update a corresponding merchant record 123 to record information that associates the merchant location, and status information to indicate the merchant is in possession of a registered and active UPPC 10. In this way, the corresponding merchant record 123 can associate an identifier of the UPPC 10 (e.g., numerical identifier) with the registered state and the merchant location. Additionally, the merchant record 123 can link the identifier of the UPPC 10 with a share funding account 20.

The shared funding account 20 can be controlled or managed by the resources of the system 100, such as implemented through the switch 150. The system 100 can manage or control one or more shared funding accounts, with each activated UPPC 10 being linked to one of the shared funding accounts. Each shared funding account 20 provides a mechanism for providing immediate payment or payment authorization to a merchant for purpose of funding a transaction made through a corresponding UPPC 10 that is resident at a given merchant location. Furthermore, as described with examples below, the payment processing system 100 is configured to use the shared funding account 20 to fund individual prepaid cards on a temporary or per-use basis.

An example of FIG. 1 also recognizes that a conversation rate in which merchants of the geographic region activate the UPPC 10 can be relatively low. However, customers who are incentivized to request access of the UPPC 10 can serve as a mechanism for triggering activation of individual UPPC 10. Accordingly, system 100 can record merchant locations where UPPCs 10 were sent, as well as those merchant locations where the UPPC 10 is registered and activate.

Card Registration with First Customer Use

According to some examples, a customer who is a first-in-time user of a given UPPC 10 can trigger a merchant into registering the UPPC 10 that is physically present at the merchant location. The first-in-time use can occur when, for example, a customer enters the merchant location with the intent or desire to use a UPPC 10. The customer can, for example, provide a card use request 127 through an application running on the customer's mobile computing device 121 that forms part of the customer interface 120. The card use request 127 can be provided as a series of communications which include a preliminary query 129 ("PQ 129") for merchants which offer the UPPC 10 or which have an unregistered UPPC 10.

In some variations, a search component can receive or otherwise field the preliminary query 129 in order to generate a result 119 which identify merchants which (i) have an active and registered UPPC 10 onsite, or (ii) are believed to have an unregistered or inactive UPC 10 onsite)=. The result 119 can identify a list of merchants by, for example, name or address or through geographic coordinates. The customer interface 120 can then render a presentation (e.g., list or map) of the result 119. From the result 119, the user/customer can make a selection of merchant location of interest, and the selection can correspond to the card use request 127. In some variations, the card use request 127 can be made through user input, and optionally as part of a transaction that also utilizes the preliminary query 129. In variations, the card use request 127 can be made by programmatically detecting (e.g., through the customer interface 120, tracking the position of the customer mobile computing device) the customer entering the merchant location. Still further, the card use request 127 can be generated when the customer requests use of the prepaid card and is at the merchant location or within a predefined distance from the merchant location. The inclusion of a proximity or presence condition with the customer use request 127 can facilitate the system 100 in persuading the merchant to register the UPPC 10.

When the merchant location of the card use request 127 does not have a UPPC 10 which is registered, the card use request 127 can be communicated as a trigger 139 to the registration manager 118 of system 100 to contact (or send a notification to) the merchant where the unregistered card resides. In one example, the registration manager 118 implements a registration process which identifies a phone number or other communication identifier of the merchant from a corresponding merchant record 123 of the merchant data store 115. The workflow implemented by the registration manager 118 can include programmatically triggering an initial communication 117 such as a phone call to the merchant and using either a human or pre-recorded message to guide the merchant through a process in which the merchant can register the UPPC 10. If the customer is co-located at the merchant location (or nearby), information about the customer (e.g., first name, picture, description, etc.) can be communicated to the merchant in order to make the prospect of the transaction with the customer more credible. By linking the registration of the UPPC 10 to the request of a customer at the merchant location, the conversion rate by which merchants seek to register an unsolicited UPPC 10 can be increased. Additionally, if the merchant was sent a UPPC 10 but did not keep it when the customer makes the request, the registration manager 118 can provide the merchant with an opportunity to order a new card.

As part of the registration process, the merchant can be told to perform an initial payment processing of the UPPC 10 for a small payment. The UPPC 10 can be in the form of a prepaid debit card which can be processed using a standard point-of-sale terminal, such as a point-of-sale terminal which processes a VISA or MASTERCARD instrument. During the registration process, the payment switch 150 can implement controls to decline the transaction, but the act of the merchant running the UPPC 10 through the merchant's point-of-sale terminal results in the transaction manager 130 obtaining information that can link the UPPC 10 with the point-of-sale terminal of the merchant operator. In one implementation, the transaction manager 130 can use the payment switch 150 to check the shared funding account 20 for the initial payment processing that was performed by the merchant. The payment switch 150 can also include logic to identify the point-of-sale terminal and/or merchant location from which the UPPC 10 was processed. Thus, the UPPC can be sent to merchants without any pre-identification to the merchant, then subsequently used at the merchant terminal, where the identification between merchant (and merchant point-of-sale terminal) can be made. In this way, the identifier of the point-of-sale terminal, as well as the identifier of the UPPC 10 in use with the merchant can be obtained and linked in the merchant data store 115. As described in greater detail, the data linking the merchant identifier and/or point-of-sale terminal to the particular UPPC 10 can serve as a security mechanism. The payment switch 150 can approve future use of the UPPC 10 if future payment processing operations that specify the identifier of the UPPC 10 originate from the merchant location or merchant point-of-sale terminal.

Once the setup of the merchant is complete, the transaction with the user can be implemented as a background process which requires minimal involvement from the customer. For example, the customer may be able to physically enter the merchant location and receive goods or services without directly interacting with the merchant operator.

Card Usage

When the merchant has registered a UPPC 10, a process for enabling a customer to use the UPPC 10 for the transaction can include the merchant making the card use request 127. Depending on implementation, the card use request 127 can be made either before or after the user/customer enters the merchant location. Additionally, the card use request 127 can be triggered based on one or more of (i) user input (e.g., user selecting the merchant location for use with UPPC 10), or (ii) automatically, based in part on the user's location. For example, the user can include a setting on their mobile computing device 121 which generates a notification or prompt when the customer is in a merchant location where the UPPC 10 is offered. When at the location, the user can respond to the prompt in order to signal his or her interest to conduct a transaction at the merchant location. As an alternative, the user can generate the query 129 when in a particular geographic region in order to receive the result 119 which identifies merchant locations where a corresponding UPPC 10 is located. When the user subsequently enters one of the merchant locations provided in their result 119 (e.g., within a predefined threshold of time, or in accordance with a schedule), one implementation provides that the user intent is inferred.

The transaction manager 130 can receive the card use request 127, and trigger the merchant interface 110 to implement a programmatic or automated process to contact a merchant operator at the particular location. According to one aspect, merchant interface 110 informs the merchant that a particular customer at the merchant location intends to use the UPPC 10. A message (e.g., recorded human message) or other communication 131 can be communicated to the merchant operator to inform the merchant operator that a customer wishes to use the UPPC 10. For example, the communication from merchant interface 110 can be in the form of an application content, text message or other message medium. For example, the communication 131 can be sent to a mobile computing device of an operator at the merchant location. The communication 131 can identify the customer, such as the customer's name and/or customer image.

The merchant can provide a response 133 using functionality of the merchant interface 110 that acknowledges the card use request 127. In one implementation, the merchant response 133 can be provided through a computing device 111 of the merchant (e.g., merchant mobile computing device or MCD) running a merchant application that includes functionality for implementing the merchant interface 110. As an alternative or variation, the merchant response 133 can correspond to a message 133 (e.g., text message), such as an SMS or MMS message. Optionally, the merchant MCD 111 which receives the communication 131 and provides the response 133 can be operated by either an employee or employer. For example, a restaurant operator (e.g., waiter, host, or proprietor) can be notified of a customer and the card use request 127. The communication 131 from the merchant interface 110 can be communicated to the merchant MCD 111 of a waiter, and the response 133 can also originate from the waiter. Depending on the implementation, the exchange of communication 131 and response 133 can occur before and/or after the customer is seated, or at any point before when the customer is provided the bill. The response 133 can be forwarded to the customer, and the customer can leave (or "dash") the premise of the merchant location when the service and/or goods is complete.

According to some examples, the payment processing system 100 performs separate fund transfer operations in order (i) fund the shared funding account 20 for the merchant benefit when processing the UPPC 10, and (ii) obtain funds from the customer for the customer's transaction with the merchant. In some examples, the payment processing system 100 maintains the shared funding account 20 at a particular minimum level to provide sufficient funds to encompass a designated minimum number of transactions. In such implementations, the shared funding account 20 can be linked to multiple UPPC 10, and the funding of the shared funding account 20 can occur with or independent of specific transactions. In variations, the shared funding account 20 is funded for individual users or transactions. As described in greater detail, the funding can be a fixed amount, an estimated amount or an actual amount of the transaction. In some variations, the shared funding account 20 is overfunded, and the overfunded portion is withdrawn from the shared funding account 20, or reapplied for another transaction after a given transaction is complete. When the shared funding account 20 is funded on an as needed basis, one implementation provides for the shared funding account 20 to be linked to a single UPPC 10. In the examples provided, the shared funding account 20 provides a secure and certain source of payment for a transaction conducted through the UPPC 10, which is retained by the merchant for customers.

In variations, at a point after the customer commits to receiving the good or service, the transaction manager 130 can access the customer data set 141 to obtain customer information for use in the transaction. The customer information can include customer financial account identifier 157, which enables the payment switch 150 to perform a payment processing operation ("PPO 163") using the customer account 30. In this way, the transaction manager 130 can be responsive to an event or condition in the course of the customer engaging the merchant, at which point the transaction manager 130 signals a trigger 169 to the payment switch 150 in order to obtain funds 155 (or authorization to obtain funds) from the customer account 30 for application to the customer's transaction. The funds 155 can be stored in an account of the payment processing system 100.

In examples, the funds 155 can be obtained from the customer account 30 before or after the payment switch 150 performs deposit funding operation 159 for the shared funding account 20. Thus, the payment processing system 100 can fund the shared funding account 20 independently of obtaining funds from the customer account 30. For example, the shared funding account 20 can be funded or overfunded for the customer's transaction before funds are obtained from the customer account 30. In some variations, the funds are not obtained from the customer account 30 until conditions have been met, such as in the case of the customer leaving the merchant location and then providing approval for the payment processing system 100 wo withdraw funds from the customer account 30.

In some variations, the shared funding account 20 can be funded (via deposit funding operation 159) by the payment switch 150, in response to or otherwise after when (i) the customer provides input indicating the customer's intent to use the UPPC 10, (ii) the customer is detected as entering the merchant location, (iii) the customer is detected as staying inside the merchant location for a duration of time that exceeds a threshold, and/or the (iv) the merchant operator providing input that confirms that the customer will be able to use the UPPC 10. The transaction manager 130 can monitor or otherwise detect conditions which can be used to fund or perform the deposit funding operation 159. According to some examples, the transaction manager 130 signals the trigger 163B for the payment switch 150 in order to perform the deposit funding operation 159.

The amount funded to the shared funding account 20 can be based on one or more factors, including (i) a customer profile, such as the amount a customer usually spends for a particular type of transaction (e.g., lunch at restaurant), (ii) a merchant profile (e.g., classification of merchant as provided by electronic processing system 100 or third-arty, median or typical price range from merchant), and/or (iii) a predetermined flat fee amount. In variations, the funding of the shared funding account 20 can be based on an amount which is indicated by input from the merchant operator. The transaction manager 130 can signal the funding of the shared funding account 20 via the payment switch 150. In some variations, the transaction manager 130 can signal the payment switch 150 to overfund the shared funding account 20, and then withdraw the overfunded portion once the merchant processes payment against the 10.

Once the service or good is provided, the transaction manager 130 can signal one or more merchant communications 131 to the merchant interface 110 (e.g., application running on the merchant MCD 111). The merchant communications 131 can include prompts for the merchant interface 110 to perform a payment processing operation using the UPPC 10, so as to receive funds or (authorization for funds) from the shared funding account 20. The merchant can perform the payment processing operation through the merchant's existing third-party payment network (e.g., VISA, MASTERCARD, AMERICAN EXPRESS, DISCOVER, ACH). Additionally, the merchant can provide, via the merchant interface 110, a transaction communication 143, which includes information about the customer's transaction. The information of the transaction communication 143 can identify an amount (or preliminary amount) of the transaction. In one implementation, the information of the transaction communication 143 can include an image of the customer's receipt. As an addition or variation, the customer interface 120 can programmatically determine when the transaction is complete by monitoring the customer's position and/or communicating the position information of the customer as a mechanism for indicating that the customer is no longer located at the merchant location.

In certain cases like restaurant and meal preparation, the amount of the transaction can correspond to a preliminary amount, which can be supplemented or augmented by the customer. The transaction communication 143 can be generated before or after when the merchant performs the payment operation for the UPPC 10 using the shared funding account 20. In some implementations, an amount specified in the transaction communication 143 can be referenced against an authorization made against the shared funding account from the merchant or the merchant's point-of-sale terminal.

According to one implementation, the transaction manager 130 can implement a holding queue 135 which maintains a transaction record 137 that pairs card use request 127 (e.g., customer identifier 117 ("CI") from the customer data set 141) with the transaction communication 143 confirming the transaction has been completed at the merchant location. Once the transaction is detected as being complete, transaction manager 130 uses the customer identifier to determine the customer funding account identifier 157. The customer funding account identifier 157 can be communicated to payment switch 150, which then performs another payment processing operation ("PPO 169") to obtain authorization or funds from the customer funding account 30. Prior to obtaining funds from the customer funding account, the transaction manager 130 can initiate an approval process to receive an approval from the customer. According to one implementation, the transaction manager 130 generates a communication 147 that is communicated to the customer via the customer interface 120. The communication 147 can include or correspond to the transaction communication 143 provided from the merchant. Thus, the communication 147 can convey, for example, an image of the receipt. The customer can signal a response 149 to confirm agreement with the amount of the transaction. For certain kind of transactions, the customer may supply a tip 153 (or surcharge) with the response 149. The tip 153 can be received through the customer interface 120 by the transaction manager 130, and then communicated back to the merchant via the merchant interface 110. The merchant can then implement another payment processing operation against the shared funding account 20 for the tip amount 153.

Additional Usage Scenarios and Alternative Examples

While numerous examples are detailed in context of restaurants, examples as described also pertain to other types or merchants and transactions. For example, an example of FIG. 1 can be implemented in context of a retail merchant, such as a grocery store, can provide UPPC 10, which the customer can access as a mechanism to avoid checkout. The customer may create a record of merchandise items which the customer intends to purchase, and then the customer can walk out of the merchant location with the merchandise items. The record of the merchandise items which the customer purchased can be made through, for example, the customer interface 120 (e.g., through an application running on a mobile computing device of the customer). As an alternative or variation, the record of the items which the customer identify for purchase can be made at an interface provided by the merchant location. For example, the merchant location can include a barcode scanner which the customer can operate to identify items that he or she wishes to purchase.

According to other variations, a customer can reserve the UPPC 10 of a merchant using alternative form an alternative set of conditions or events which mark customer intent and authenticity. The particular set of conditions or events can be set for the type of transaction, or made specific for the merchant. For example, the merchant can provide an online or network accessible interface for access and use to the UPPC 10, which the user could access and immediately use through, for example, the customer interface 120 (e.g., user accesses an application to access the UPPC 10). The merchant may then receive orders and queue or sequentially process them using their UPPC 10. As an example, a restaurant can offer a delivery service through a web page or application. The user can access the restaurant delivery interface to place an order, then select the UPPC 10 option at checkout. When checking out, the customer can specify a name and/or other identifier which can enable the payment processing system 100 to determine the customer account 30. Then the merchant can run the UPPC 10 for the customer account 30, and the customer can receive the receipt after the transaction is processed, as described with examples above.

In another variation, the merchant can provide a reservation interface for which the user can reserve a particular time slot for having the transaction processed. The customer can specify the product or service for the transaction (e.g., an item from the menu), and then select a time period for when the product or service is to be received. In that time period, the merchant can provide the product/service and run the UPPC 10, as described with other examples.

In some variations, the payment processing system 100 can also be used to enable delayed transactions. According to one example, the customer can enter a merchant location which offers the UPPC 10. For example, the customer can enter a store and learn from viewing the customer interface 120 (e.g., application running on user mobile computing device) that the particular store offers the UPPC 10 as an option. The customer can manually or automatically (e.g., through pre-approved setting) identify himself to the customer in order to receive information about what products or services the customer offers, such as products on sale, a product catalog or products which the customer identifies as being of interest to him (e.g., customer scans barcode through customer interface 120). For example, the merchant can send a message to the customer through a messaging application or through an application of the customer interface. The customer can select items for purchase from the merchant communication, either while the customer is in the store or after the customer has left the store. For example, the customer can view the merchant catalog hours or days after leaving the store, and then operate the customer interface 120 (or contact the merchant directly) to select merchandise items for purchase. Once the items have been identified for purchase, the merchant can process the transaction through the UPPC 10.

As another implementation, some merchants provide subscription services in connection with an in-store user experience. For example, wineries provide taste sessions (user experience) and if the customer appreciates the wine and wants to purchase a subscription, the user can indicate his intent to the merchant, who then processes the UPPC 10 for the merchant. The result is that the user experience is not interrupted. Alternatively, the user can enjoy the experience, elect to receive subscription or product information from the merchant at a later time, and optionally make a delayed transaction for the subscription.

In various examples, the merchant can use the electronic payment processing system 100 to develop a relationship with the customer. For example, the customer may opt to receive promotions from merchants whom he or she transacts with, and once the customer visits a merchant, the merchant can then market promotions or coupons to the customer, either through the customer interface 120 or directly.

While numerous examples provide for the UPPC 10 to be provided on a physical medium, in variations, the UPPC 10 can be stored and used by the merchant in electronic form. For example, the merchant can store the numeric identifier of the UPPC 10, which can originally be provided to the merchant as a physical card. The merchant may also be able to simultaneously use an electronic version of the UPPC 10, or alternatively a combination of electronic and physical version of the UPPC 10, from multiple point-of-sale terminals.

Alternatively, the payment processing system 100 can issue electronic UPPC 10, which the merchant can store and utilize on an ongoing basis. The electronic UPPC 10 can be provided in any one of a variety of electronic medium, and serve to link a payment card to a shared funding account.

Still further, once the customer engages a merchant for the first time by requesting use of the UPPC 10, the transaction process of the second or follow on experience of the customer can be made even more automated for both customer and merchant. For example, the merchant can maintain a roster of individuals who use the UPPC 10, and when the customer re-enters the merchant location, the merchant can initiate the payment process without any input from the customer.

Methodology

Figure 2:
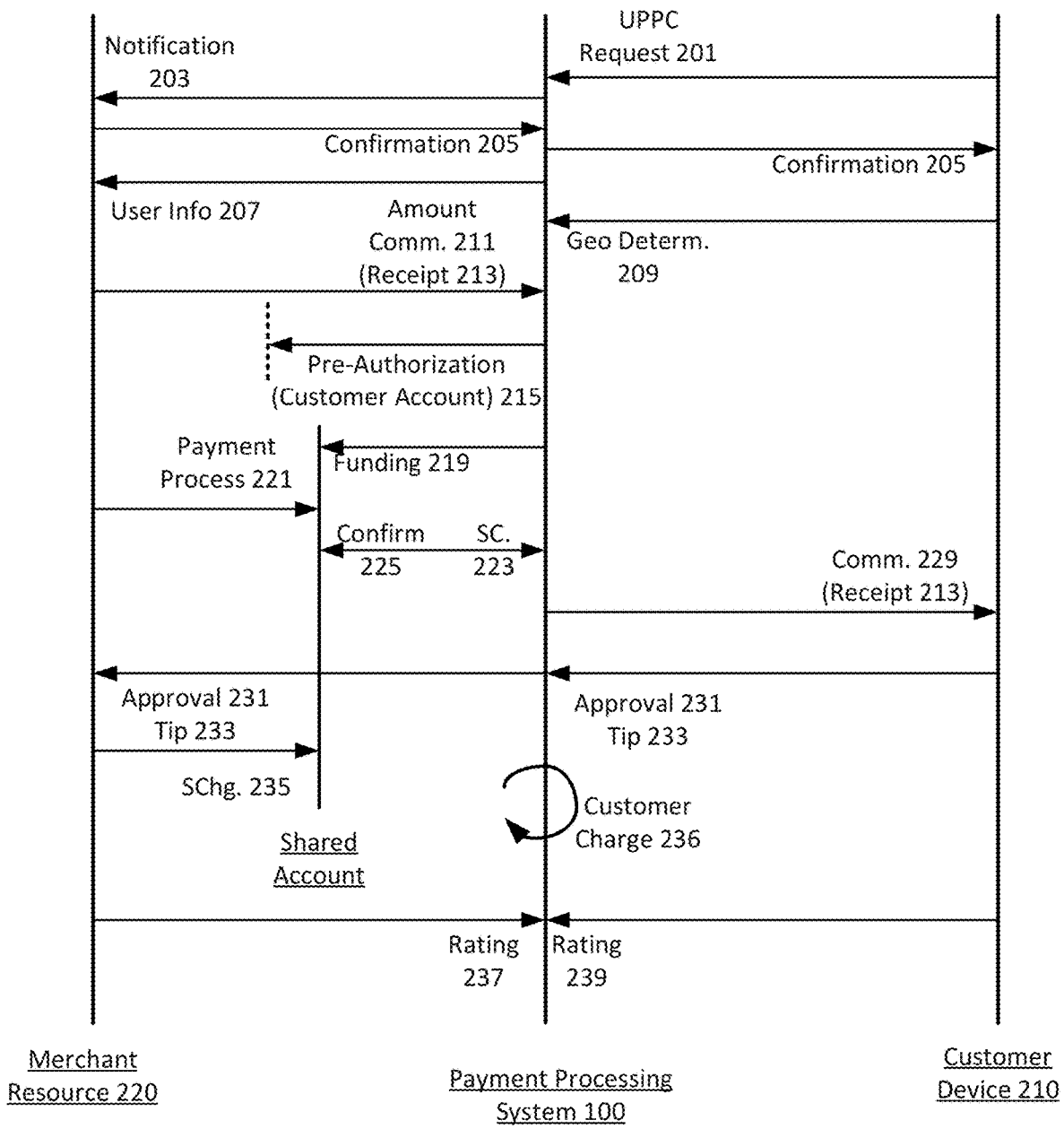
FIG. 2 illustrates a sequence diagram for implementing a payment processing system, in accordance with one or more examples.

FIG. 2 illustrates a sequence diagram for implementing a payment processing system, in accordance with one or more examples. In an example of FIG. 2, a payment processing system 100 can implement a service for enabling a customer to use a mobile computing device ("MCD 210") and a UPPC 10 in order to conduct a transaction at a merchant location. In an example of FIG. 2, the merchant can be assumed to operate one or more of a point-of-sale terminal, telephonic communication medium, and/or mobile computing device (e.g., device with an application interface to a merchant service portal for payment processing system 100) at the merchant location where the transaction is to take place, collectively labeled as merchant resources 220 in FIG. 2.

In an example of FIG. 2, the customer operates the MCD 210 to generate a UPPC request 201 for the payment processing system 100. The UPPC request 201 can specify that the customer wishes to engage in an onsite transaction with a specific merchant. In an example of FIG. 1, the transaction manager 130 can receive and process the UPPC request 201 as the customer use request 127.

In one implementation, the payment processing system 100 can signal a notification 203 to the merchant resource 220, which can be resident at the merchant location. For example, the payment processing system 100 can signal the notification 203 through an application interface of payment processing system 100, and the application interface can be installed or otherwise implemented on a mobile computing device associated with the merchant location (e.g., mobile computing device of proprietor or employee). Alternatively, the payment processing system 100 can (i) initiate a telephonic communication to the merchant, and/or (ii) send an email or message through an alternative communication medium, in order to provide notice to the merchant that a customer intends to request use of the merchant's UPPC 10.

The merchant resource 220 can send a confirmation 205 to the payment processing system 100, confirming that the merchant is ready and willing to provide the UPPC 10 for the customer. With reference to an example of FIG. 1, the merchant resource 220 can be implemented as the MCD 111 (of proprietor or employee), on which a corresponding service application for the payment processing system 100 is executed. The service application can, for example, display notifications or messages corresponding to merchant communications 131, on which notifications (e.g., notification 203) or prompts can be rendered. The merchant response (e.g., confirmation 205) can also be signaled through the service application of the merchant MCD 111.

In response to receiving the confirmation 205, the payment processing system 100 can provide the merchant resource 220 with information about the customer, in order to facilitate, for example, the merchant in identifying the customer. In one implementation, the payment processing system 100 can send a user information communication 207, such as a message or application notification which includes content that displays the name, picture and/or other identifier (e.g., mobile computing device phone number) of the customer to the merchant resource 220. For example, the user information communication 207 can correspond to a service application notification provided to a mobile computing device of the merchant, and the notification can include a picture, name and/or other identifier of the customer who is requesting to use the UPPC 10. In variations, the payment processing system 100 can trigger a telephonic communication to the merchant, and a programmatic or human operator can audibly provide information to the merchant about the customer who is requesting to use the UPPC 10. The information provided can include a description of the customer (e.g., customer name, general physical description, etc.), and/or contextual information (e.g., customer is arriving at a particular time, or is located in a particular location in the merchant premise, etc.).

The customer can initiate or engage with the merchant upon entering the merchant location. For example, the customer can enter a restaurant and request seating (with guests), order from the menu, etc. In some variations, the processing system 100 can receive geographic data 209 from the customer MCD 210 in order to programmatically track the location of the customer and identify when, for example, the customer approaches the desired location and/or enters the merchant location. Still further, the payment processing system 100 can use the geographic data 209 to track the location of the customer so that when the customer leaves the merchant location, a determination (preliminary or otherwise) is made that the transaction has been completed (e.g., the customer has completed his meal service from a restaurant). Thus, the geographic tracking of the customer location can be used as a marker to identify when, for example, the transaction is over or when the customer has received the product or service of the transaction.

In some variations, the customer UPPC request 201 can be made in advance of the customer entering the merchant location. Some variations provide that the UPPC request 201 and the follow on communications are exchanged before the customer enters the merchant location. In variations, some of the communications (e.g., user information communication 207) are triggered in response to geographic data 209 communicated from the customer MCD device 210 indicating the customer has entered the merchant location or is in a threshold proximity (e.g., 50 yards) to the merchant location. The payment processing system 100 can make a determination as to the location of the customer based on the geographic data 209 which is communicated from the customer mobile computing device 210. For example, the user information communication 207 can be sent to the merchant resource 220 in response to, or only after the customer enters the premise of the merchant location. Thus, for example, the user information communication 207 can be timed to occur once the user enters the merchant location (e.g., user waits to be seated at a restaurant), or is seated down and receiving service. Still further, in some variations, the customer UPPC request 201 or follow on communications can be triggered after the customer has received the service (e.g., after when the customer has ordered or received food, or would request the check). Still further, while an example of FIG. 2 illustrates communications exchanged as between the customer MCD 210 and the processing system 100, and the processing system 100 and merchant resources 220, some variations provide that the MCD 210 and the merchant resources 220 exchange some communications directly. For example, the processing system 100 can serve to link the customer MCD 210 and the merchant resources 220 so that some communications such as confirmation 205 and user information communication 207 are signaled between the customer MCD 210 and the merchant resource 220 as peers.

In some examples, when the transaction is complete or near complete (e.g., customer leaves restaurant) so that at least the preliminary transaction amount (i.e., pre-tip) is known to the merchant, the merchant can perform actions to obtain funds for the transaction. In one example, the merchant can first signal an amount communication 211 to the payment processing system 100. The amount communication 211 can represent the bill, check or invoice. For restaurants, the amount communication 211 can be pre-tip, or alternatively include a default tip amount (which optionally the customer can change).

In some examples, the amount communication 211 can include an image of the receipt 213 for the transaction. For example, when the customer transaction is complete, the merchant can take an image of the receipt and message the image to the payment processing system 100. In one implementation, the merchant resources 220 can include a merchant service application which runs on the mobile computing device of the merchant. The image can be communicated via email, SMS, MMS or through an interface provided with the service application.

Additionally, the merchant resources 220 can initiate a payment process operation 221 in order to obtain funds for the transaction through a shared funding source of the UPPC 10 (e.g., funded shared account 20; or dynamically assigned or created account). The payment processing operation 221 can be performed by the merchant using existing or standard point-of-sale merchant resources. Thus, the payment processing operation 221 can be at least submitted using components that reside independent of the payment processing system 100. In some examples, when the transaction is complete or near complete (e.g., customer receives meal at restaurant, eats meal, etc.), the merchant can use the merchant resources 220 to initiate a payment process operation 221 through the point-of-sale terminal at the merchant location in order to access funds from the shared funding account 20. In accessing the shared funding account 20, the merchant can use a third-party payment network (e.g., VISA, MASTERCARD, AMERICAN EXPRESS, DISCOVER or ACH) in order to perform the payment processing operation 221.

In some variations, the payment processing service 100 (e.g., via the payment switch 150) can monitor access to the shared funding account 20. In some examples, when the merchant resources 220 implement the payment processing operation 221, the payment processing system 100 identifies a funding request from monitoring the shared account 20. For example, the payment switch 150 can monitor the shared funding account 20 for an access request from the merchant (e.g., from the merchant point-of-sale device) for funds from the shared funding account 20.

In one aspect, the payment processing system 100 can perform one or more security checks ("SC 223") as to (i) matching a source of the payment processing operation 221 with the point-of-sale terminal (or other merchant identifier) used to run the UPPC 10, and (ii) checking an amount of the charge entered by the merchant. With reference to an example of FIG. 1, the merchant data store 115 can be used to confirm that that the UPPC 10 was received from the appropriate source. Additionally, in some examples, the transaction manager 130 can receive merchant communications, including transaction communication 143, which may include information such as an image of the receipt (e.g., merchant can use feature phone to capture image of receipt). In one implementation, the security check 223 can trigger a process in which, for example, the transaction manager 130 checks the amount on the receipt 213 of the transaction against the amount that was processed through the payment processing operation 221. If the amounts are the same, then the payment processing system 100 can signal confirmation 225 of the security checks 223 for the shared funding account 20. When the confirmation 225 is provided, the payment switch 150 can provide or permit withdrawal of the amounts requested by the merchant when running the UPPC 10.

An example of FIG. 2 provides for alternative variations or implementations as to when the payment processing operation 221 can be initiated, and what communications or events need to occur in advance of the payment processing operation 221 being initiated. For example, in FIG. 2, the completion of the service or product of the transaction can be detected automatically by monitoring the geographic data 209 transmitted from the customer MCD 210. For example, the geographic data 209 can indicate that the customer has left the merchant location. As an addition or alternative, the customer can operate a service application for the payment processing system 100 on the customer MCD 210, in order to signal that the transaction is complete. As still another variation, the merchant can signal an input or perform another action indicating the transaction is complete, or at least ready for payment processing. For example, the customer can be detected as leaving the merchant location, by tracking location information communicated from the MCD 210. The merchant resource 220 can independently provide an amount notification, which can communicate an invoice, a sales slip, a bill, or a check to the payment processing system 100. When such events or conditions occur, the payment processing operation 221 can be performed to process the UPPC 10 and the shared funding account 20.

In some variations, the payment processing system 100 can perform a pre-authorization 215 of the customer account 30 in order to ensure payment is received for funding the shared account 20. In one implementation, payment processing system 100 can be selective in performing the authorization. For example, pre-authorization 215 can be performed when the customer is new to the payment processing system 100, or when the customer is at a geographic region that is distant from his normal location.

As mentioned with other examples, the UPPC 10 can be associated with a particular shared funding account 20, and payment processing system 100 can provide funding signal 219 to the funding account 20 in anticipation of the customer incurring a charge at the merchant location. With reference to an example of FIG. 1, the transaction manager 130 of the payment processing system 100 can signal the payment switch 150 to perform deposit funding operations 159 into the shared account 20. In this way, the shared account 20 can optionally be funded in advance of the customer completing a transaction with the merchant, such as in advance of the customer receiving a product or service from the merchant at the merchant location. In an example of FIG. 2, the payment processing operation 221 by which the merchant obtains funds from the shared funding account 20 can follow events which include the shared funding account 20 being funded (e.g., via the by the payment processing system 100) specifically for the transaction of the particular customer.

The payment processing system 100 can signal a communication 229 to the customer as to the transaction amount. In one implementation, the communication 229 can forward the receipt 213 provided from the merchant. The communication medium for forwarding the image of the receipt to the customer can be through messaging (e.g., email, SMS, MMS) or through an application interface of the customer application with the payment processing system 100. The customer can view the communication 229 and, in most cases, signal an approval 231 of the transaction and amount (e.g., unless for example, the customer and the merchant were in a dispute).

In addition to approval 231, the customer can include a tip or surcharge 233. For example, in restaurant transactions, the preliminary amount (or amount of the receipt 213) can optionally exclude tip or surcharge. The customer can use the customer MCD 210 to view (e.g., through a service application to the payment processing system 100) and electronically sign or approve the receipt. The electronic form can include a feature to enable the customer to add a tip or surcharge amount. In variations, the tip or surcharge amount can be added automatically based on default or customer settings (e.g., 18%).

In an example of FIG. 2, the approval 231, along with the surcharge 233 can be communicated from the customer to the payment processing system 100, and to the merchant via the merchant resources 220. On receipt, the merchant can run the UPPC 10 a second time (or second charge, "SChg 235") against the shared funding account 20 in order to withdraw the tip or surcharge.

The payment processing system 100 can charge 236 the customer account 30 for the total transaction (amount of the receipt and tip). For example, the payment switch 150 can perform the payment processing operation 163 against the customer account 30 to transfer funds 155 to an account of the payment processing system 100.

In some examples, each of the customer and merchant can have an opportunity to provide the other with a rating 237, 239. The rating 237, 239 can be tallied or made cumulative to affect the reputation of the customer/merchant with respect to other customers or merchants who use the payment processing system 100.

Methodology

Figure 3:
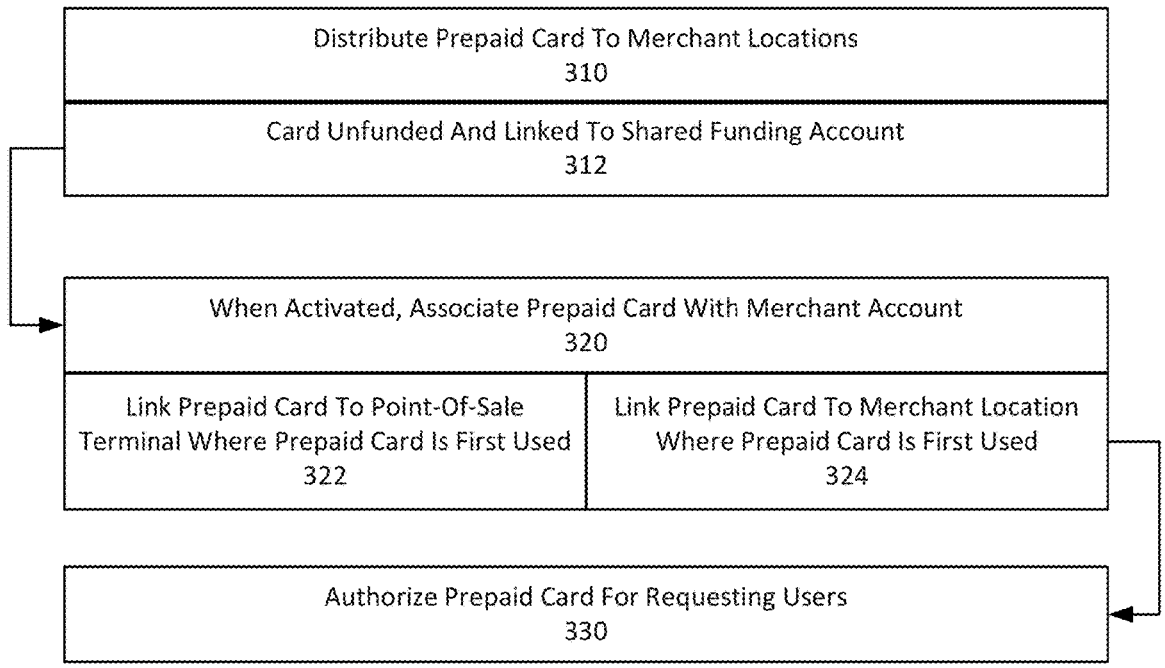
FIG. 3 illustrates a method for providing a universal prepaid card to a set of merchants, according to one or more embodiments.
Figure 4:
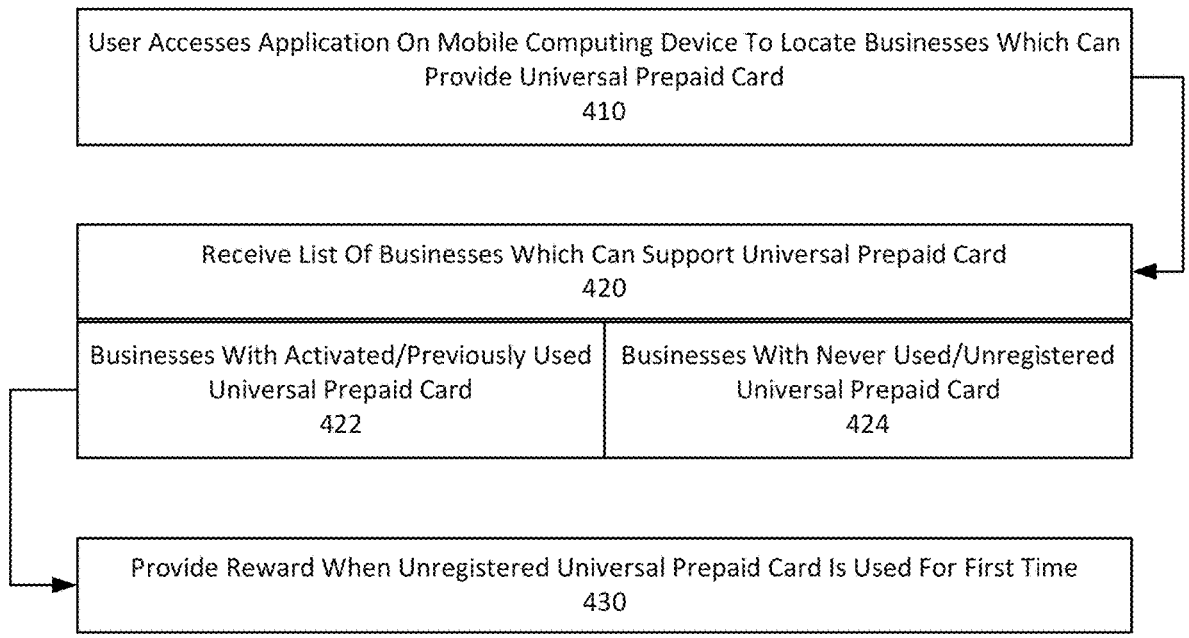
FIG. 4 illustrates a method for first time use of a universal prepaid card, according to one or more embodiments.
Figure 5:
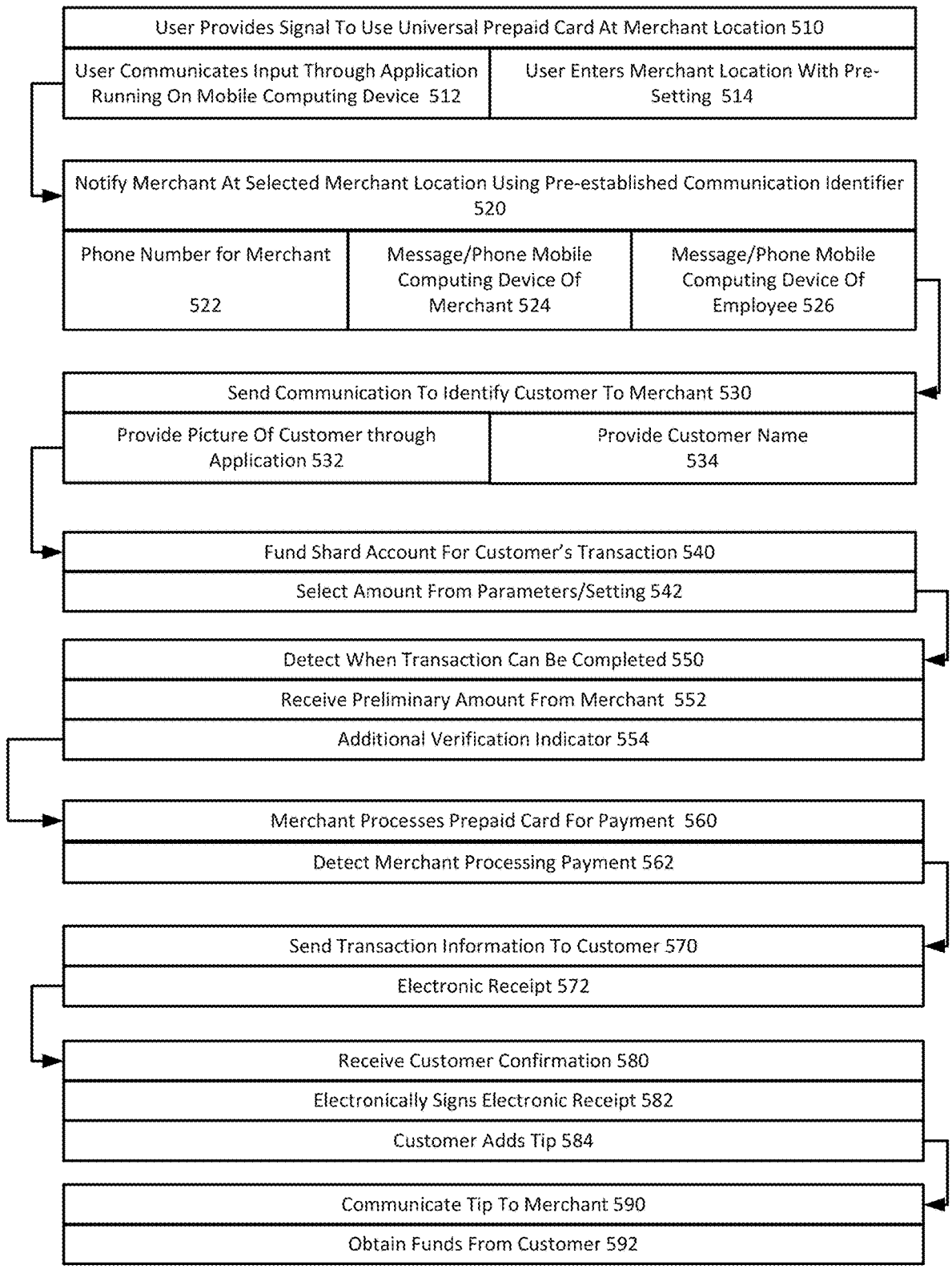
FIG. 5 illustrates a method for implementing a service for providing a universal prepaid card, according to one or more embodiments.

FIG. 3 illustrates a method for providing a universal prepaid card to a set of merchants, according to one or more embodiments. FIG. 4 illustrates a method for first time use of a universal prepaid card, according to one or more embodiments. FIG. 5 illustrates a method for implementing a service for providing a universal prepaid card, according to one or more embodiments. An example method of FIG. 3 or FIG. 4 can be implemented using a system such as described with an example of FIG. 1. Accordingly, reference may be made to elements of FIG. 1 for purpose of illustrating a component of a system for performing a step or sub-step being described.

With reference to an example of FIG. 3, a collection of blank prepaid cards can be distributed to a group of merchants (310). The cards individually can be distributed with no pre-association to any account or merchant, but each card can be activated to be linked to a shared funding account 20 and merchant (or merchant point-of-sale terminal) (312).

When an individual card is activated, the card can be associated with the merchant (320). In one implementation, the association or link can be provided between the activated prepaid card and the merchant's point-of-sale terminal (322). As an addition or variation, the association or link can be provided between the merchant location (e.g., as communicated via GPS) and the prepaid card (324). A process such as implemented with the registration component 318 can be used to activate individual cards and link the prepaid cards to merchants. Once activated and linked, the cards can be described as UPPC 10.

Once activated, the UPPC 10 can be authorized for requesting users. The manner in which the UPPC 10 can be implemented, for example, include processes described with the transaction manager 130 and/or payment switch 150.

With reference to an example of FIG. 4, a customer can utilize UPPC 10 at merchant locations through an application on the customer's mobile computing device (410). In one implementation, the customer can operate a mobile computing device to receive a list of businesses which provide a UPPC 10 (420). The businesses can be located by, for example, a general geographic search, or alternatively, a specific name search. With reference to FIG. 1, for example, the customer MCD 121 can submit a geographic query (e.g., zip code, street address), name query, category description or other search term for the search component 122, which in turn provides results 119 which identify matching businesses with the UPPC 10.

The list of businesses which are provided to the user can also be distinguished to indicate whether the business has an active and available UPPC 10 on site (422), or whether the business has yet to use or activate a UPPC 10 (424). For example, the result 119 returned to the customer MCD 121 can also identify the state (e.g., activated or not activated) of the UPPC 10 at the business establishment. The state can optionally reflect those businesses which have not activated the UPPC 10, but which were included on a distribution list for blank cards. Such businesses can be targeted for first in time users, on the probability that the business may have the blank card in the premise and ready for activation.

When the UPPC 10 is first used, the customer and/or business can receive an award for the first time use. For example, the payment processing system can pay the customer or the merchant for using the card. The award system can provide a mechanism for promoting the use of the UPPC 10.

With reference to an example of FIG. 5, a customer can provide an intent signal to a payment processing system 100 (see FIG. 1) for use of a UPPC 10 at a specific merchant location (510). For example, the customer can operate an application of a mobile computing device to specify a business by business name, street address, map pin, or other search term (512). Thus, in one implementation, the customer can communicate the input through an application running on a mobile computing device. In a variation, the customer can communicate the intent and merchant indirectly through activity, which can be detected by the payment processing system (514). For example, geographic data 209 (see FIG. 2) can be transmitted form the customer mobile computing device to the payment processing system 100. The geographic data 209 can reflect, for example, when the customer is at a particular merchant, or type of merchant. If the customer stays at the location an extended period of time, the customer can be provided a prompt or other communication to offer the customer to use the UPPC 10 at the merchant location.

Once the customer is confirmed on intent to use the UPPC 10, the merchant can be notified (520). The merchant can be identified through, for example, the manual input of the customer, the search result of the customer, and/or the geographic location of the customer. The notification can be signaled to the merchant through a variety of communication mediums. For example, the payment processing system 100 can trigger a phone call to the merchant using a phone number of that is stored for the merchant (522). As an alternative or variation, the payment processing system 100 can message a mobile computing device of the merchant (e.g., application notification, SMS, MMS etc.) (524). Still further, the payment processing system can send an email or other message notification to a registered or known computer of the merchant. Still further, a mobile computing device of an employee of the merchant can be sent the notification (526).

In some variations, the customer can be identified to the merchant (530). The customer can be identified by a picture, provided through, for example, an application (for payment processing system 100) running on the customer mobile computing device 121 (532). As an addition or alternative, the customer name can be communicated to the merchant through a message or notification (534).

In variations, the notification of (520) and communication (530) can be provided at the same time, or separately. For example, the notification (520) may be signaled in advance, such as through or as a reservation for the customer and his or her party. The communication (530) may be communicated when, for example, the customer is in the merchant location or nearby. In variations, the notification (520) and communication (530) can be communicated at one time, or near contemporaneously, such as when the customer elects to use the UPPC 10 when at the merchant location.

As one example, a customer may arrive at a restaurant and be seated. A service application for payment processing system 100 may run on the customer's mobile computing device, and the application may (i) detect a location of the customer, and (ii) measure a threshold duration of time (e.g., 5 minutes) in which the customer is stationary. The application may determine the geographic coordinates of the customer once the threshold time is met, and the geographic coordinates can be communicated to the payment processing system 100. The payment processing system 100 can reference the geographic coordinates to the merchant database 115 in order to determine whether a merchant at or near the location has an active or potentially available UPPC 10. Based on GPS coordinates, the customer may be provided a notification which identifies the restaurant where he is seated, or a restaurant or other merchant which has a coordinate or location that overlaps or is sufficiently near the location of the customer. In the example provided, the customer experience is that he walks into the restaurant and takes a seat, then learns through a notification on his mobile computing device that the restaurant offers the UPPC 10. The notification can be made through the application running on the customer mobile computing device. At this point, the customer can respond to the notification to indicate his desire to use the UPPC 10 (as described in 510). The customer input can be communicated as a notification to an appropriate merchant resource (e.g., service application running on an associated computing device of the merchant) (as described with (520)). The notification to the merchant may include an image, name and/or other identifier of the customer. The customer may also receive a confirmation notification that the merchant was notified, and/or that the merchant approved the customer's request to use the UPPC 10.

Numerous variations can be implemented with respect to examples described above, based on implementation and/or preference of the customer (or merchant). For example, the customer can provide the notification of his intent to use the UPPC 10 at an earlier point in time (e.g., just prior to entering the restaurant, or when making a reservation), or at a later point in time (e.g., when he receives the check, or before he receives the check). Still further, the customer may be provided a prompt to provide input which locates and/or otherwise identifies the customer to the merchant (e.g., "Table 10", "back booth, green jacket, Andy," etc.).

With further reference to FIG. 5, the payment processing system 100 can fund the shared funding account 20 for the customer (or anticipated transaction from customer) (540). In some examples, the funding of the shared funding account 20 can be set by one or more of (i) default amount, (ii) parameters or constraints associated with the merchant, customer (e.g., whether customer has provided pre-authorization to customer credit card, history of customer), location or timing constraints (e.g., late night has lower approved amounts due to higher propensity for fraud) (542).

While an example of FIG. 5 provides for funding the shared account 20 for a particular transaction, variations can also provide that the shared funding account 20 is funded in response to general events or conditions. For example, the shared funding account 20 can be funded repeatedly or periodically (e.g., every day) or maintained at a constant amount.

Subsequently, the payment processing system 100 can determine when the merchant has provided the product or service for the transaction to the customer (550). The point during the customer/merchant interaction when the payment processing system 100 makes this determination can vary depending on implementation, as well as factors such as the type of merchant or product/service of the transaction, merchant preference or settings, and/or customer preference or settings.

In some implementations, the merchant can initiate the process for obtaining funds using the UPPC 10 at an appropriate time, such as when the customer/merchant interaction is complete (552). In the case of restaurants, the merchant can initiate the process at the time when the customer would otherwise receive the bill. In order to initiate the process to use the UPPC 10, one implementation provides that the merchant prepares the bill for the customer and then takes a picture of it. The picture of the bill (or receipt) can be communicated to the payment processing system. For example, the merchant can use a messaging application (e.g., email, SMS etc.), or operate a service application on the merchant MCD 111 to upload the picture directly. When communicating the image of the bill, the merchant can tag or otherwise include information that identifies the customer. This information can be carried over from when the customer first requested to use the UPPC 10. In one implementation, the merchant MCD 111 receives the customer identification from the customer MCD 121 or payment processing service 100 at the start of the customer interaction, then embeds or augments the image of the receipt with the identification information. The identification information can correspond to, for example, the customer name, a numeric identifier, or an optical identifier (e.g., bar code, QCode).

Some examples recognize that the merchant can initiate the payment process too quickly, such as in the case when the customer may dispute the bill. Accordingly, in some variations, an alternative or additional verification signal may be used as an indicator of the transaction being complete (554). Such verification signal can be determined from, for example, input from the customer. For example, the customer may be prompted through an application interface to provide input (e.g., screen tap) that confirms that the customer/merchant interaction is complete (or at the point where the bill can be processed). Still further, in order to reduce manual involvement from the customer, some variations provide that the payment processing system 100 can track activity and/or position of the customer to verify that the customer/merchant interaction is complete. For example, the customer MCD 121 can operate to communicate position information about the customer to the payment processing system 100. The additional verification signal can be indicated by position information which indicates that the customer has left the premise.

In variations, an additional or alternative verification signal can be provided by the passage of time. For example, the additional verification signal can correspond to a threshold duration of time (e.g., one hour) having passed since the customer first entered the merchant location. The payment processing system 100 can interpret the condition of time passage as an additional verification signal when, for example, the customer does not cancel the transaction after a threshold time period has passed. The position of the customer can also be monitored with time passage as a verification signal.

The merchant can process the UPPC 10 for payment upon the condition or set of conditions being met (560). In one implementation, the merchant can process the prepaid card after sending the image of the bill or receipt to the payment processing system 100. In variations, other conditions can be required before the merchant can process the UPPC 10 for payment of the transaction. By way of example, conditions for processing payment from the UPPC 10 can include: (i) the payment processing system 100 confirming the amount of the image receipt before the UPPC 10 can be processed, and/or (ii) input from the customer, such as customer confirmation of the amount, or customer confirmation that the interaction with the merchant is complete. The payment processing system 100 can detect when the merchant processes the UPPC 10 (562). For example, with reference to FIG. 1, the payment switch 150 can implement a process to monitor for withdrawal requests against the shared funding account 20. The monitoring can compare an amount of the withdrawal request with an amount indicated with the communication from the merchant that provided the electronic form of the receipt. Additionally, the payment switch 150 can monitor the withdrawal request for identifiers that are linked to the UPPC 10 in use. In one implementation, the identifier of the withdrawal request can link the UPPC 10 to a specific point-of-sale terminal of the merchant. If the payment switch 150 detects that the withdrawal request originate from another source, the authorization for the withdraw request can be withheld or denied. The added security feature of linking the UPPC 10 to a point-of-sale terminal prevents situations when a merchant employee or other person gains access to the UPPC 10 and attempts to withdraw funds based on his or her knowledge of an existing customer bill. For example, an unscrupulous waiter can be prevented from running the UPPC 10 on the customer's check using his own personal point-of-sale device.

According to some examples, transaction information can be communicated to the customer for approval, once the UPPC 10 is processed for payment by the merchant (570). The transaction information can include an electronic receipt that is based on, or corresponds to, the electronic information (e.g., image of physical receipt) communicated from the merchant to the payment processing system 100 (572). In one implementation, the transaction manager 130 of the payment processing system 100 receives the image and/or information from the merchant, and forwards an electronic receipt that is based on the image and/or information provided by the merchant to the customer via the customer interface. The electronic receipt can be provided to the customer via the customer MCD 121, such as with an application user-interface that includes functionality to enable the customer to signal approval or rejection of the receipt, as well as one or more features to let the customer alter the final bill amount and/or add a surcharge or gratuity amount.

The payment processing system can receive customer confirmation of the transaction through customer interaction with the electronic receipt (580). For example, the customer can provide an input through the user interface of the customer MCD 121. In some variations, the customer can provide an input in the form of an electronic signature, made through the user interface (582). Still further, the customer can provide input that includes the gratuity and/or bill modification (584).

The payment processing system 100 can then communicate the surcharge, gratuity and/or modified amount of the bill to the merchant (590). The merchant can then process the UPPC 10 again for the gratuity or modified amount. Additionally, the payment processing system 100 can obtain funds for the transaction (including the gratuity and are modified amount) using the customer account 30 (592).

Example Interface

FIG. 6A through FIG. 6E illustrate alternative graphic user interfaces for use by users of a payment processing system 100, such as described with an example of FIG. 1.

FIG. 6A and FIG. 6B illustrate examples of a customer graphic interface for implementing aspects of embodiments such as described with FIG. 1 through FIG. 5. In FIGS. 6A and 6B, the customer can operate a mobile computing device 600 on which the graphic user interface 610 for a service application is rendered. By way of example, the graphic user interface 610 as shown can be implemented as part of, for example, customer interface 120, as provided on a customer MCD 121 (see FIG. 1). In an example of FIG. 6A and FIG. 6B, the customer ("David") submits a query through the service application for nearby restaurants which offer or may offer a universal prepaid card for use. The payment processing system 100 can return a search result that identifies restaurants which include an active universal prepaid card and restaurants which may have an inactive universal prepaid card. The inactive universal prepaid cards can be held by merchants who were provided a universal prepaid card for use at their establishment, but have yet to adopt the prepaid card for use with customers. For example, each merchant of a given region can be provided an unsolicited prepaid universal card through bulk mail delivery. As described with other examples, customers of the payment processing system 100 can be incentivized to seek merchants who have been mailed a universal prepaid card, but whom have yet to activate the card. In FIG. 6A and FIG. 6B, a customer query (e.g., geographic query) can automatically generate map content 612 or other location information which identifies merchants that offer the universal prepaid card, as well as those merchants who may have an inactive universal card which the customer can attempt to use for the first time.

FIG. 6C and FIG. 6D, the merchant can operate a mobile computing device 620 on which the graphic user interface 630 for a service application is rendered. In FIGS. 6C and 6D, the merchant can operate a mobile computing device 620 on which the graphic user interface 630 for a service application is rendered. In one implementation, when the merchant activates the UPPC 10, the merchant is given the opportunity to associate a mobile computing device 620, local computer and/or point-of-sale device with the merchant account. The merchant can, for example, link a mobile computing device and download a service application for the payment processing system 100. As shown by an example of FIG. 6A and FIG. 6B, the service application can then provide a merchant user-interface 630 on which notifications 632 and other content can be rendered. In the example provided the merchant user-interface 630 can display a notification of a customer's intent to use the UPPC 10. The merchant can confirm with an input (e.g., screen tap), and then receive another notification 634 which confirms that the UPPC 10 will be used for the customer's interaction. Other examples of interfaces which can be shown the merchant include displaying an image or other information about the customer to the merchant.

Figure 6E:
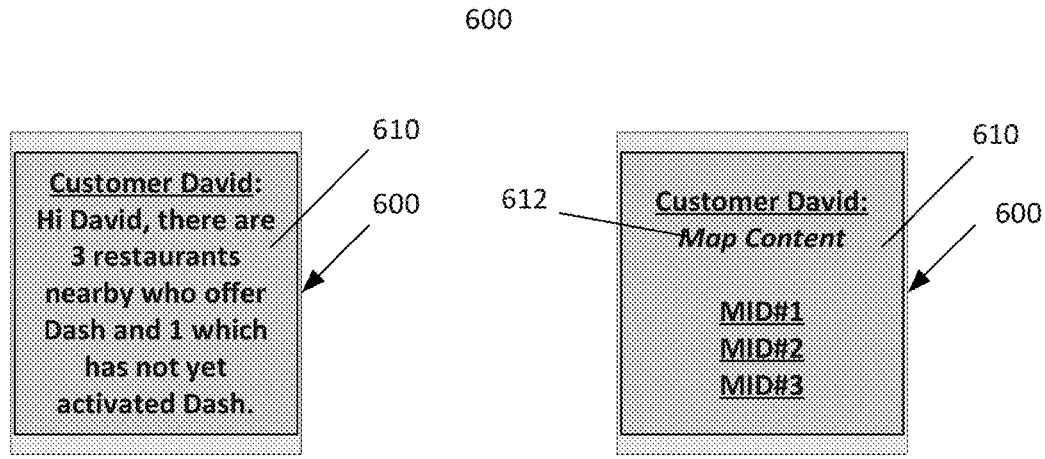
Figure 6E:
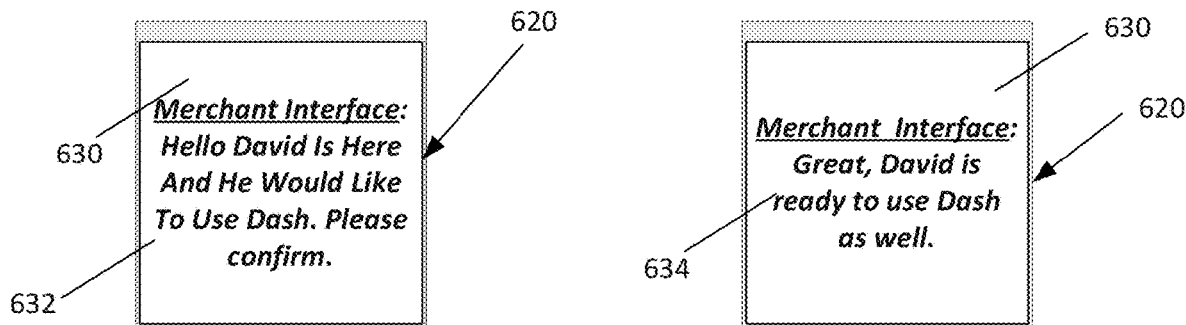
Figure 6E:
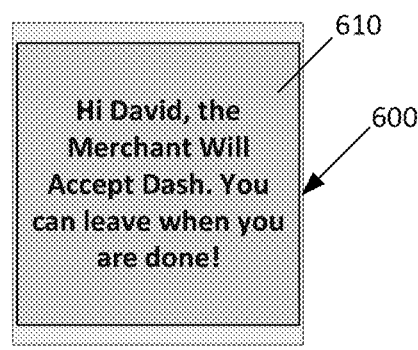

FIG. 6E illustrates the customer mobile computing device 600, providing a notification 614 that the customer can rely on the UPPC 10. By receiving the notification 614, the customer knows he can simply leave when he is done with the meal or conducted his business with the merchant.

Figure 7A:
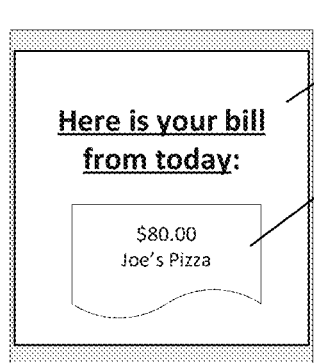
FIG. 7A through FIG. 7D illustrate examples of graphic user interfaces which can be displayed to a customer through a customer service application of a payment processing system, such as described with an example of FIG. 1.
Figure 7B:
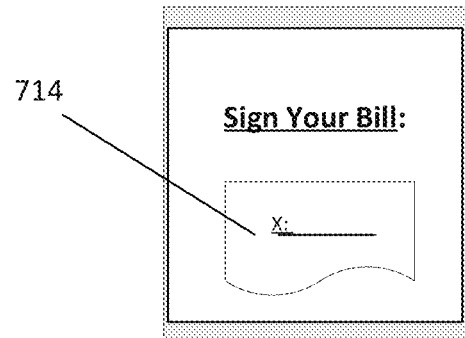
Figure 7C:
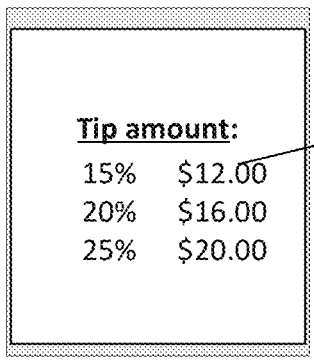
Figure 7D:
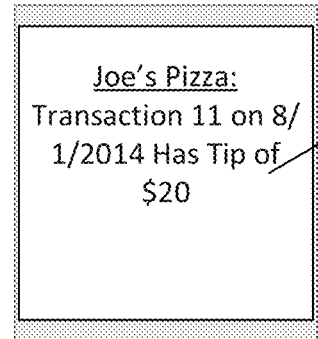

FIG. 7A through FIG. 7D illustrate examples of graphic user interfaces which can be displayed a customer through a customer service application. Graphic user interfaces such as shown with FIG. 7A through FIG. 7D can be provided as, for example, part of the customer interface 120, as rendered on a customer MCD 121. In FIG. 7A, the user interface 710 can display for the customer an electronic receipt 712, such as generated from an image taken by the merchant after the customer transaction is performed. The display of the receipt can provide the customer with an opportunity to accept or reject the bill. For example, the user interface 710 can include functionality for enabling the customer to provide input for accepting or declining the bill. In FIG. 7B, the customer can accept the bill by providing an electronic signature, using a signature feature 714. In FIG. 7C, the customer can also add a gratuity or service charge through a selection feature of a corresponding interface 716. In FIG. 7D, the customer can be displayed with a final receipt 718, which can then be uploaded to a service of the payment processing system 100.

Hardware Diagrams

Figure 8:
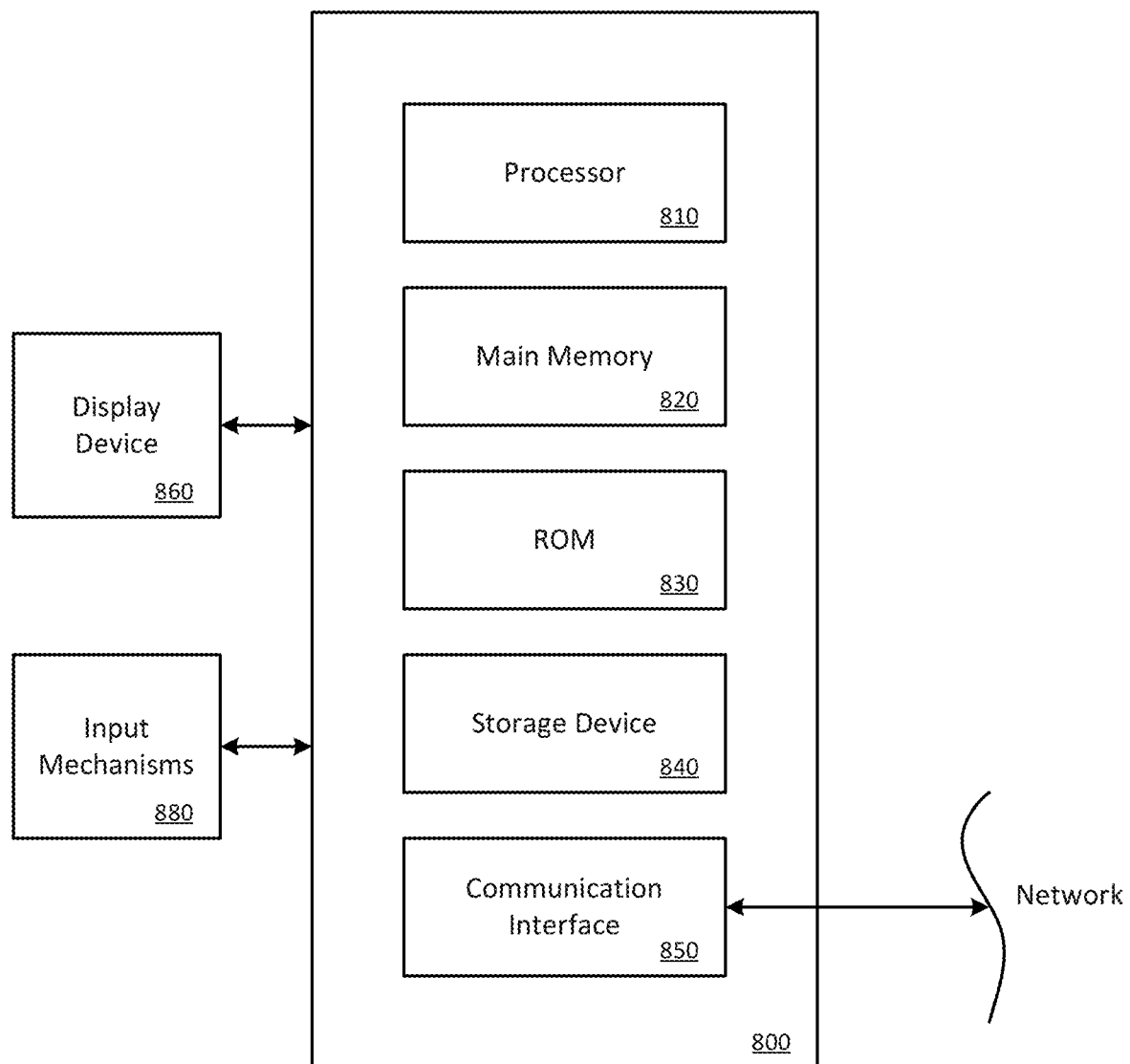
FIG. 8 is a block diagram that illustrates a computer system upon which examples described herein may be implemented.

FIG. 8 is a block diagram that illustrates a computer system upon which examples described herein may be implemented. For example, in the context of FIG. 1, the payment processing system 100 may be implemented using a computer system such as described by FIG. 7. The payment processing system 100 may also be implemented using a combination of multiple computer systems as described by FIG. 8.

In one implementation, a computer system 800 includes processing resources 810, a main memory 820, a read-only memory (ROM) 830, a storage device 840, and a communication interface 850. The computer system 800 includes at least one processor 810 for processing information and the main memory 820, such as a random access memory (RAM) or other dynamic storage device, for storing information and instructions to be executed by the processor 810. The main memory 820 also may be used for storing temporary variables or other intermediate information during execution of instructions to be executed by the processor 810. The computer system 800 may also include the ROM 830 or other static storage device for storing static information and instructions for processor 810. The storage device 840, such as a magnetic disk or optical disk, is provided for storing information and instructions, such as instructions to implement a network service of payment processing system 100.

The communication interface 850 can enable the computer system 800 to communicate with one or more networks (e.g., cellular network) through use of the network link (wireless or wireline). Using the network link, the computer system 800 can communicate with one or more computing devices, and one or more servers.

The computer system 800 can also include a display device 860, such as a cathode ray tube (CRT), an LCD monitor, or a television set, for example, for displaying graphics and information to a user. An input mechanism 880, such as a keyboard that includes alphanumeric keys and other keys, can be coupled to computer system 800 for communicating information and command selections to the processor 810. Other non-limiting, illustrative examples of input mechanisms 880 include a mouse, a trackball, touch-sensitive screen, or cursor direction keys for communicating direction information and command selections to the processor 810 and for controlling cursor movement on the display 860.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

In examples provided, the instructions can be to implement a payment processing system 100 for a universal prepaid card, such as described with an example of FIG. 1.

Still further, the instructions can be used to implement an example method for providing a service through a payment processing system 100, such as described with an example of FIG. 3 or FIG. 5.

Figure 9:
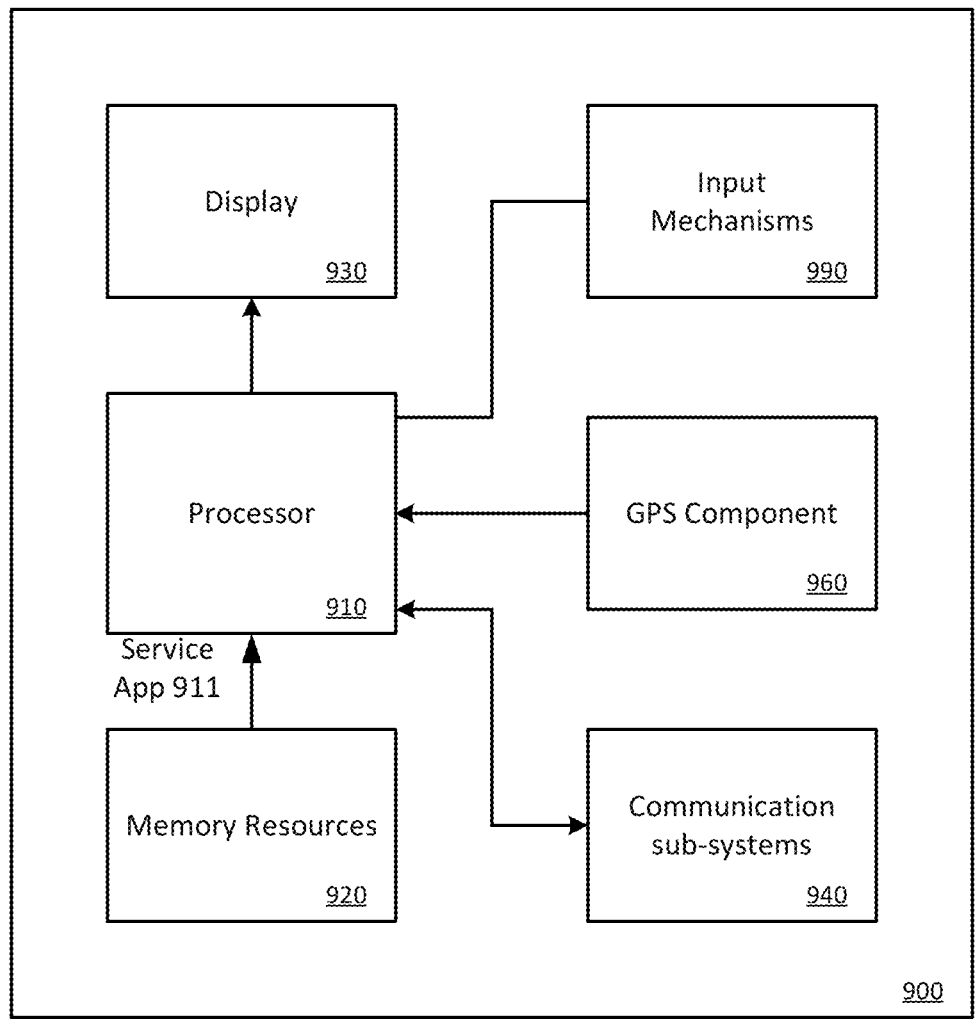
FIG. 9 is a block diagram that illustrates a mobile computing device upon which examples described herein may be implemented.

FIG. 9 is a block diagram that illustrates a mobile computing device upon which examples described herein may be implemented. In one embodiment, a computing device 900 may correspond to a customer mobile computing device (e.g., customer MCD 121) or merchant mobile computing device (e.g., merchant MCD 111). The mobile computing devices can correspond to, for example, a cellular device that is capable of telephony, messaging, and data services. The computing device 900 can correspond to a client device or a driver device. Examples of such devices include smartphones, handsets or tablet devices for cellular carriers. The computing device 900 includes a processor 910, memory resources 920, a display device 930 (e.g., such as a touch-sensitive display device), one or more communication subsystems 940 (including wireless communication sub-systems), input mechanisms 950 (e.g., an input mechanism can include or be part of the touch-sensitive display device), and one or more location detection mechanisms (e.g., GPS component or receiver) 960. In one example, at least one of the communication sub-systems 940 sends and receives cellular data over data channels and voice channels.

The processor 910 can be configured with software and/or other logic to perform one or more processes, steps and other functions such as described with the merchant interface 110 (see FIG. 1), customer interface 120, example methods of FIG. 4. More generally, the processor 910 can execute a service application 911 for either a customer or merchant, in order to receive functionality of payment processing system 100 (see FIG. 1). Accordingly, the processor 910 is configured, with instructions and data stored in the memory resources 920, to operate a service application such as described with various examples. For example, instructions for operating the service application in order to display user interfaces can be stored in the memory resources 920 of the computing device 900.

A user can operate a client device (such as a computing device 900) to operate a customer service application 911 for utilizing payment processing system 100 as a customer. The customer service application 911 can be used to perform a variety of functions, such as search for merchants which offer a universal prepaid card, request use of the prepaid card, and accept/sign for receipts. By way of example, in using the customer service application, location data point 965, such as a location data point corresponding to the current location of the computing device 900, can be determined from the GPS component 970. The location data point 965 can be wirelessly transmitted to the payment processing system via the communication sub-systems 940 as part one or more determinations made regarding the interaction between customer and merchant. Other users can operate a client device (such as computing device 900) to operate a service application for utilizing payment processing system 100 as a merchant. For example, a merchant service application 913 can be implemented to receive notifications from the payment processing system 100, and to communicate information (e.g., image of receipt) to the payment processing system 100.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system implementing a network transaction service, the computer system comprising:
a network communication interface being remotely connected, over one or more wireless networks, to mobile computing devices of users of the network transaction service, the network transaction service comprising a shared account for the user to utilize with registered merchants utilizing the network transaction service;
one or more processors; and
a memory storing instructions that, when executed by the one or more processors, cause the computer system to:
receive, via the network communication interface, a transaction request from a computing device of a requesting user of the network transaction service, the transaction request comprising (i) a request to utilize the network transaction service at a physical merchant location of a registered merchant of the network transaction service, and (ii) position information indicating a location of the requesting user, wherein the requesting user has a customer account linked to the network transaction service;
based on receiving the transaction request, determine a merchant account of the registered merchant, the merchant account being linked to the network transaction service; and
execute a remote transaction operation to transfer funds from the shared account of the network transaction service to the merchant account to fulfill the transaction request, the shared account being different from the customer account of the requesting user.

2. The computer system of claim 1, wherein the position information is received from a global positioning system of the computing device of the requesting user, and wherein the executed instructions further cause the computer system to:
based on the position information, determine that the requesting user is located at the physical merchant location.

3. The computer system of claim 2, wherein the executed instructions further cause the computer system to:
transmit, via the network communication interface, a notification to the computing device of the requesting user, the notification informing the requesting user that the network transaction service is available for use at the physical merchant location.

4. The computer system of claim 1, wherein the network communication interface further remotely connects the computer system to a computer terminal of the registered merchant at the physical merchant location, and wherein the executed instructions further cause the computer system to:
transmit, via the network communication interface, a message to the computer terminal of the registered merchant, the message indicating that the requesting user is utilizing the network transaction service for the transaction request.

5. The computer system of claim 4, wherein the executed instructions further cause the computer system to:
- based on transmitting the message, receive, from the computer terminal of the registered merchant via the network communication interface, a confirmation that the registered merchant authorizes use of the network transaction service to fulfill the transaction request from the requesting user; and
- based on the confirmation, transmit, via the network communication interface, a notification to the computing device of the requesting user, the notification indicating that the requesting user can leave the physical merchant location.

6. The computer system of claim 1, wherein the executed instructions further cause the computer system to:
- transmit, via the network communication interface, an electronic receipt corresponding to the transaction request to the computing device of the requesting user.

7. The computer system of claim 1, wherein the executed instructions further cause the computer system to:
- receive, via the network communication interface, a pre-authorization from a financial entity corresponding to the customer account for an amount corresponding to the transaction request;
- wherein the executed instructions cause the computer system to transfer the funds from the customer account to the shared account based on the pre-authorization.

8. The computer system of claim 1, wherein the computer system processes the transaction request from the requesting user without the requesting user and the registered merchant communicating directly with one another.

9. The computer system of claim 1, wherein the network transaction service comprises multiple registered merchants, and wherein the executed instructions further cause the computer system to:
- transmit, to the computing device of the requesting user via the network communication interface, a notification indicating that the network transaction service is available when the requesting user is within a given vicinity to a corresponding physical merchant location of each of the multiple registered merchants.

10. The computer system of claim 1, wherein the executed instructions cause the computer system to link a universal prepaid card of the network transaction service with the shared account in response to the universal prepaid card being utilized at a point-of-sale terminal of the registered merchant.

11. The computer system of claim 10, wherein the universal prepaid card is linked with the point-of-sale terminal of the registered merchant and utilized by the registered merchant at the point-of-sale terminal to fulfill the transaction request from the requesting user.

12. The computer system of claim 1, wherein the executed instructions cause the computer system to further execute the remote transaction operation by transferring funds from the customer account to the shared account of the network transaction service based on detecting, from the position information received from the computing device of the requesting user, the requesting user leaving the physical merchant location.

13. A non-transitory computer readable medium storing instructions that, when executed by one or more processors of a computer system implementing a network transaction service, cause the computer system to:
- remotely connect, over one or more wireless networks, to mobile computing devices of users of the network transaction service, the network transaction service comprising a shared account for the user to utilize with registered merchants utilizing the network transaction service;
- receive, via a network communication interface, a transaction request from a computing device of a requesting user of the network transaction service, the transaction request comprising (i) a request to utilize the network transaction service at a physical merchant location of a registered merchant of the network transaction service, and (ii) position information indicating a location of the requesting user, wherein the requesting user has a customer account linked to the network transaction service;
- based on receiving the transaction request, determine a merchant account of the registered merchant, the merchant account being linked to the network transaction service; and
- execute a remote transaction operation to transfer funds from a shared account of the network transaction service to the merchant account to fulfill the transaction request, the shared account being different from the customer account of the requesting user.

14. The non-transitory computer readable medium of claim 13, wherein the executed instructions further cause the computer system to:
- based on the position information, determine that the requesting user is located at the physical merchant location.

15. The non-transitory computer readable medium of claim 14, wherein the executed instructions further cause the computer system to:
- transmit, via the network communication interface, a notification to the computing device of the requesting user, the notification informing the requesting user that the network transaction service is available for use at the physical merchant location.

16. The non-transitory computer readable medium of claim 13, wherein the network communication interface further remotely connects the computer system to a computer terminal of the registered merchant at the physical merchant location, and wherein the executed instructions further cause the computer system to:
- transmit, via the network communication interface, a message to the computer terminal of the registered merchant, the message indicating that the requesting user is utilizing the network transaction service for the transaction request.

17. The non-transitory computer readable medium of claim 16, wherein the executed instructions further cause the computer system to:
- based on transmitting the message, receive, from the computer terminal of the registered merchant via the network communication interface, a confirmation that the registered merchant authorizes use of the network transaction service to fulfill the transaction request from the requesting user; and
- based on the confirmation, transmit, via the network communication interface, a notification to the computing device of the requesting user, the notification indicating that the requesting user can leave the physical merchant location.

18. The non-transitory computer readable medium of claim 13, wherein the executed instructions further cause the computer system to:
- transmit, via the network communication interface, an electronic receipt corresponding to the transaction request to the computing device of the requesting user.

19. The non-transitory computer readable medium of claim 13, wherein the executed instructions further cause the computer system to:

receive, via the network communication interface, a pre-authorization from a financial entity corresponding to the customer account for an amount corresponding to the transaction request;

wherein the executed instructions cause the computer system to transfer the funds from the customer account to the shared account based on the pre-authorization.

20. A computer-implemented method of implementing a network transaction service, the method being performed by one or more processors and comprising:

remotely connecting, over one or more wireless networks, to mobile computing devices of users of the network transaction service, the network transaction service comprising a shared account for the user to utilize with registered merchants utilizing the network transaction service;

receiving, via a network communication interface, a transaction request from a computing device of a requesting user of the network transaction service, the transaction request comprising (i) a request to utilize the network transaction service at a physical merchant location of a registered merchant of the network transaction service, and (ii) position information indicating a location of the requesting user, wherein the requesting user has a customer account linked to the network transaction service;

based on receiving the transaction request, determining a merchant account of the registered merchant, the merchant account being linked to the network transaction service; and executing a remote transaction operation to transfer funds from a shared account of the network transaction service to the merchant account to fulfill the transaction request, the shared account being different from the customer account of the requesting user.

\* \* \* \* \*